(12) United States Patent
Mo et al.

(10) Patent No.: US 10,735,066 B2
(45) Date of Patent: Aug. 4, 2020

(54) METHODS OF BEAM CODEBOOK GENERATION FOR THE 5G TERMINALS

(71) Applicant: Samsung Electronics Co., Ltd., Suwon-si, Gyeonggi-do (KR)

(72) Inventors: Jianhua Mo, Garland, TX (US); Pengda Huang, Allen, TX (US); Boon Loong Ng, Plano, TX (US); Jianzhong Zhang, Plano, TX (US); SangHyun Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/224,531

(22) Filed: Dec. 18, 2018

(65) Prior Publication Data

US 2019/0222275 A1    Jul. 18, 2019

Related U.S. Application Data

(60) Provisional application No. 62/609,444, filed on Dec. 22, 2017, provisional application No. 62/676,718, (Continued)

(51) Int. Cl.
 *H04B 7/04* (2017.01)
 *H04B 7/0456* (2017.01)
 (Continued)

(52) U.S. Cl.
 CPC ......... *H04B 7/0478* (2013.01); *H04B 7/0482* (2013.01); *H04B 7/0608* (2013.01);
 (Continued)

(58) Field of Classification Search
 CPC .. H04B 7/0478; H04B 17/391; H04B 7/0482; H04B 7/0608; H04W 52/365; H04W 64/003; H04W 72/048
 (Continued)

(56) References Cited

U.S. PATENT DOCUMENTS 9,184,952 B2    11/2015   Wu et al.
10,256,880 B2    4/2019   Park et al.
(Continued)

FOREIGN PATENT DOCUMENTS

| JP | 2014-513482 A | 5/2014 |
| WO | 2017/0035252 A1 | 1/2017 |
| WO | 2017184190 A1 | 10/2017 |

OTHER PUBLICATIONS

Pi, "Optimal Transmitter Beamforming with Per-antenna Power Constraints", 2012 IEEE International Conference on Communications (ICC), Jun. 2012, pp. 3779-3784.
(Continued)

*Primary Examiner* — Michael R Neff

(57) ABSTRACT

A method of a user equipment (UE) in a wireless communication system is provided. The method comprises identifying E-field data of each antenna of the UE to be used for transmitting and receiving data, generating, based on the E-field data, a set of codewords including a first and second upper bounds, the set of codewords corresponding to candidate beams of each antenna, selecting at least one codeword from the set of codewords based on a performance criteria, configuring a codebook to be used for each antenna by adding the at least one codeword into the codebook, determining whether the codebook including the at least one codeword satisfies a condition to stop adding another codeword to the codebook, and applying the configured codebook for use in transmitting or receiving the data at each antenna based on whether the condition is satisfied.

20 Claims, 26 Drawing Sheets

Related U.S. Application Data filed on May 25, 2018, provisional application No. 62/716,597, filed on Aug. 9, 2018, provisional application No. 62/740,564, filed on Oct. 3, 2018, provisional application No. 62/742,035, filed on Oct. 5, 2018.

(51) Int. Cl.
*H04W 64/00* (2009.01)
*H04W 72/04* (2009.01)
*H04W 52/36* (2009.01)
*H04B 7/06* (2006.01)
*H04B 17/391* (2015.01)
*H04W 52/42* (2009.01)

(52) U.S. Cl.
CPC ........ *H04B 17/391* (2015.01); *H04W 52/365* (2013.01); *H04W 64/003* (2013.01); *H04W 72/048* (2013.01); *H04B 7/0465* (2013.01); *H04W 52/367* (2013.01); *H04W 52/42* (2013.01)

(58) Field of Classification Search
USPC ........................................................ 375/262
See application file for complete search history.

(56) References Cited

U.S. PATENT DOCUMENTS

| | | | |
|---|---|---|---|
| 2009/0022133 A1* | 1/2009 | Wiberg | H04L 1/0025 370/342 |
| 2009/0268840 A1* | 10/2009 | Clerckx | H04B 7/0417 375/267 |
| 2013/0058424 A1 | 3/2013 | Enescu et al. | |
| 2013/0169485 A1* | 7/2013 | Lynch | G01S 3/72 342/417 |
| 2015/0092878 A1 | 4/2015 | Tee et al. | |
| 2016/0198474 A1 | 7/2016 | Raghavan et al. | |
| 2018/0102817 A1 | 4/2018 | Park et al. | |
| 2018/0146419 A1 | 5/2018 | Raghavan et al. | |
| 2019/0260430 A1* | 8/2019 | Cai | H04B 7/0417 |

OTHER PUBLICATIONS

International Search Report dated Sep. 3, 2019 in connection with International Patent Application No. PCT/KR2019/006321, 4 pages.
Witten Opinion of the International Searching Authority dated Sep. 3, 2019 in connection with International Patent Application No. PCT/KR2019/006321, 4 pages.

* cited by examiner

METHODS OF BEAM CODEBOOK GENERATION FOR THE 5G TERMINALS

CROSS-REFERENCE TO RELATED APPLICATION(S) AND CLAIM OF PRIORITY

The present application claims priority to:
U.S. Provisional Patent Application Ser. No. 62/609,444, filed on Dec. 22, 2017;
U.S. Provisional Patent Application Ser. No. 62/676,718, filed on May 25, 2018;
U.S. Provisional Patent Application Ser. No. 62/716,597, filed on Aug. 9, 2018;
U.S. Provisional Patent Application Ser. No. 62/740,564, filed on Oct. 3, 2018; and
U.S. Provisional Patent Application Ser. No. 62/742,035, filed on Oct. 5, 2018.
The content of the above-identified patent documents are incorporated herein by reference.

TECHNICAL FIELD

The present application relates generally to beam management. More specifically, this disclosure relates to beam codebook generation for an advanced communication system.

BACKGROUND

In a wireless communication network, a network access and a radio resource management (RRM) are enabled by physical layer synchronization signals and higher (MAC) layer procedures. In particular, a user equipment (UE) attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra-reliable low latency (URLLC), massive machine type communication (mMTC), each corresponding to a different coverage requirement and frequency bands with different propagation losses is desirable.

SUMMARY

Embodiments of the present disclosure provide beam codebook generation for an advanced communication system.

In one embodiment, a user equipment (UE) in a wireless communication system is provided. The UE comprises antennas, and a processor operably connected to the antennas. The processor is configured to identify E-field data of each of the antennas of the UE to be used for transmitting and receiving data, generate, based on the E-field data, a set of codewords including a first and second upper bounds, the set of codewords corresponding to candidate beams of each of the antennas, select at least one codeword from the set of codewords based on a performance criteria, configure a codebook to be used for each of the antennas by adding the at least one codeword into the codebook, determine whether the codebook including the at least one codeword satisfies a condition to stop adding another codeword to the codebook, and apply the configured codebook for use in transmitting or receiving the data at each of the antennas based on whether the condition is satisfied.

In another embodiment, a method of a user equipment (UE) in a wireless communication system is provide. The method comprises identifying E-field data of each antenna of the UE to be used for transmitting and receiving data, generating, based on the E-field data, a set of codewords including a first and second upper bounds, the set of codewords corresponding to candidate beams of each antenna, selecting at least one codeword from the set of codewords based on a performance criteria, configuring a codebook to be used for each antenna by adding the at least one codeword into the codebook, determining whether the codebook including the at least one codeword satisfies a condition to stop adding another codeword to the codebook, and applying the configured codebook for use in transmitting or receiving the data at each antenna based on whether the condition is satisfied.

In yet another embodiment, a non-transitory computer readable medium comprising instructions, that when executed by at least one processor, perform a method, is provided. The method comprises identifying E-field data of each antenna of the UE to be used for transmitting and receiving data, generating, based on the E-field data, a set of codewords including a first and second upper bounds, the set of codewords corresponding to candidate beams of each antenna, selecting at least one codeword from the set of codewords based on a performance criteria, configuring a codebook to be used for each antenna by adding the at least one codeword into the codebook, determining whether the codebook including the at least one codeword satisfies a condition to stop adding another codeword to the codebook, and applying the configured codebook for use in transmitting or receiving the data at each antenna based on whether the condition is satisfied.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 34, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 28 GHz, 39 GHz, 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
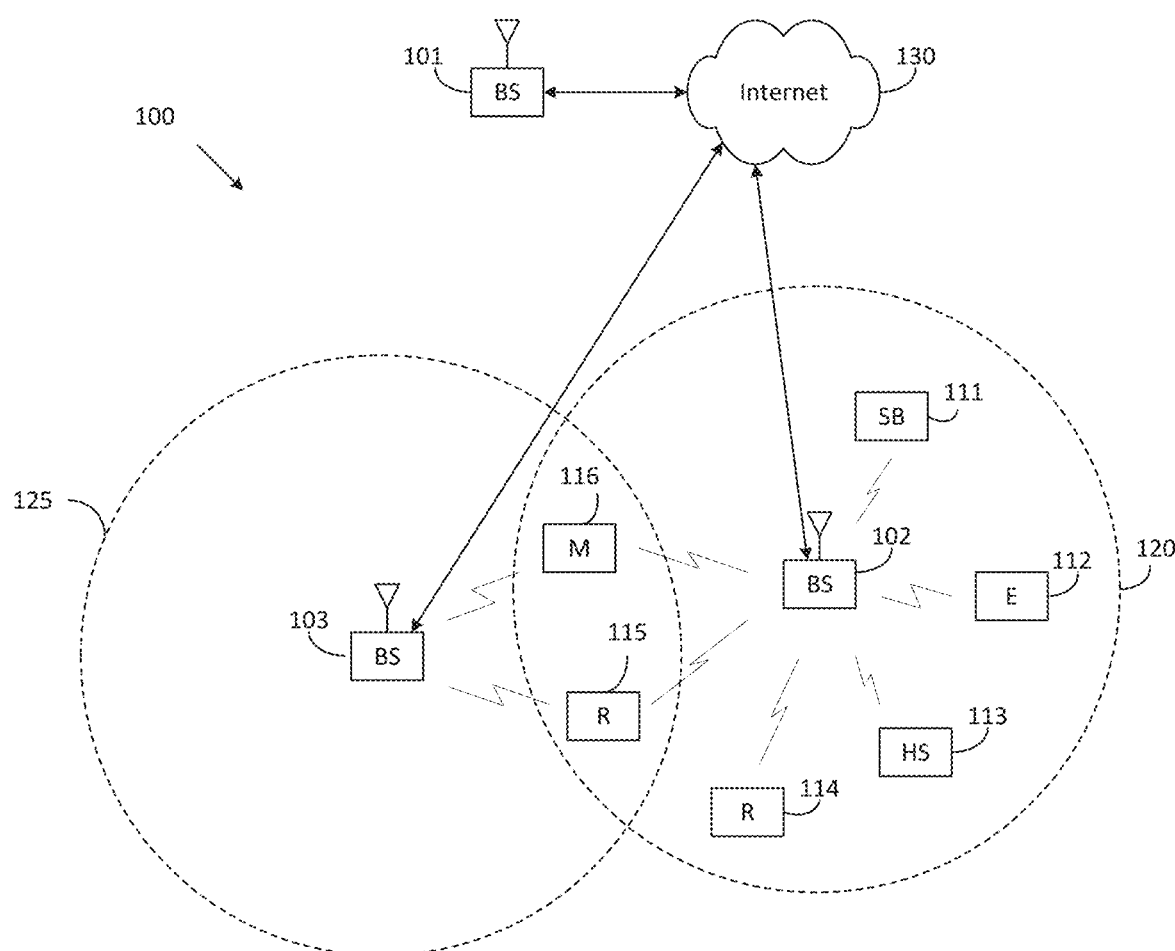
FIG. 1 illustrates an example wireless network according to embodiments of the present disclosure.
Figure 2:
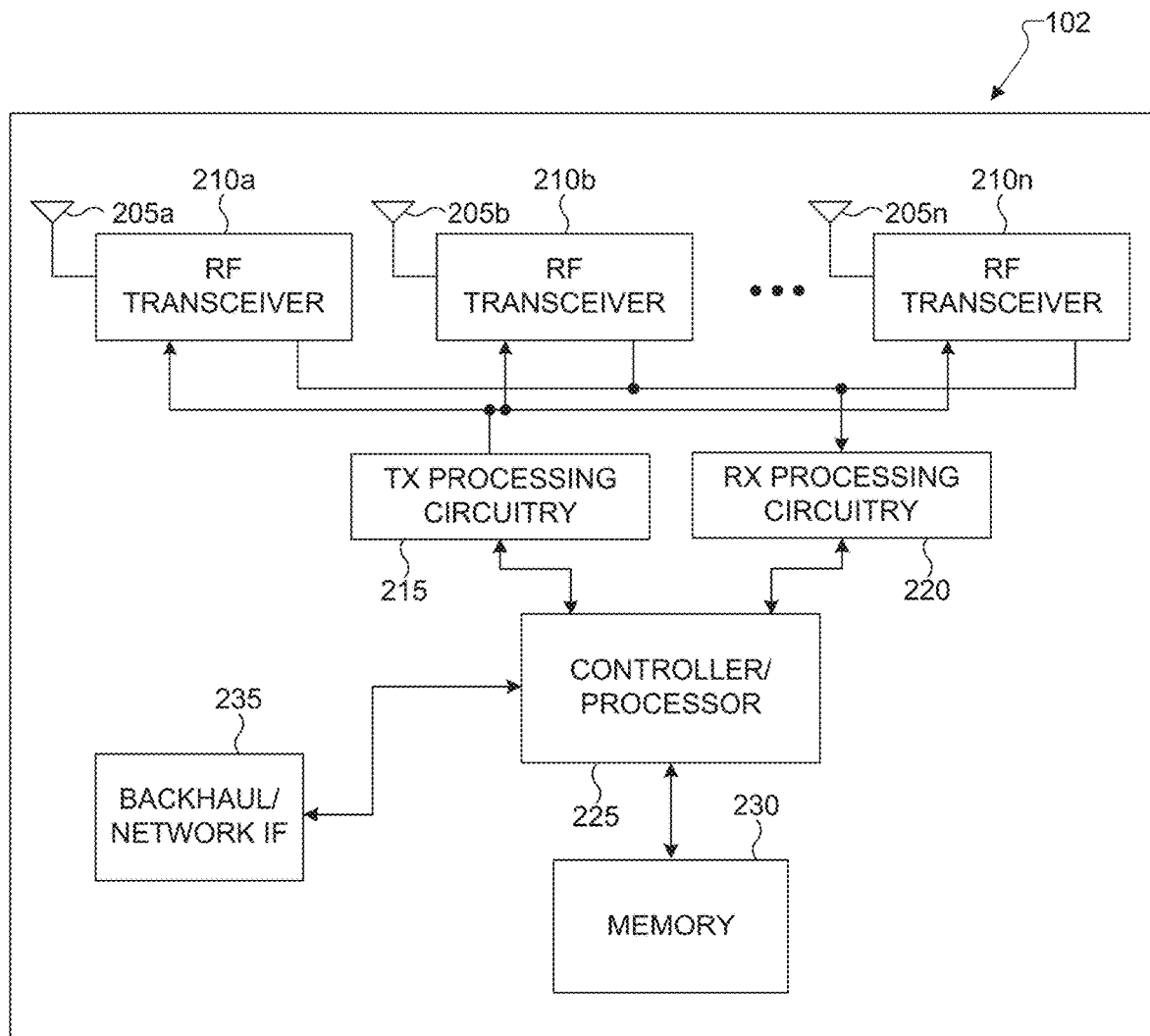
FIG. 2 illustrates an example gNB according to embodiments of the present disclosure.
Figure 3:
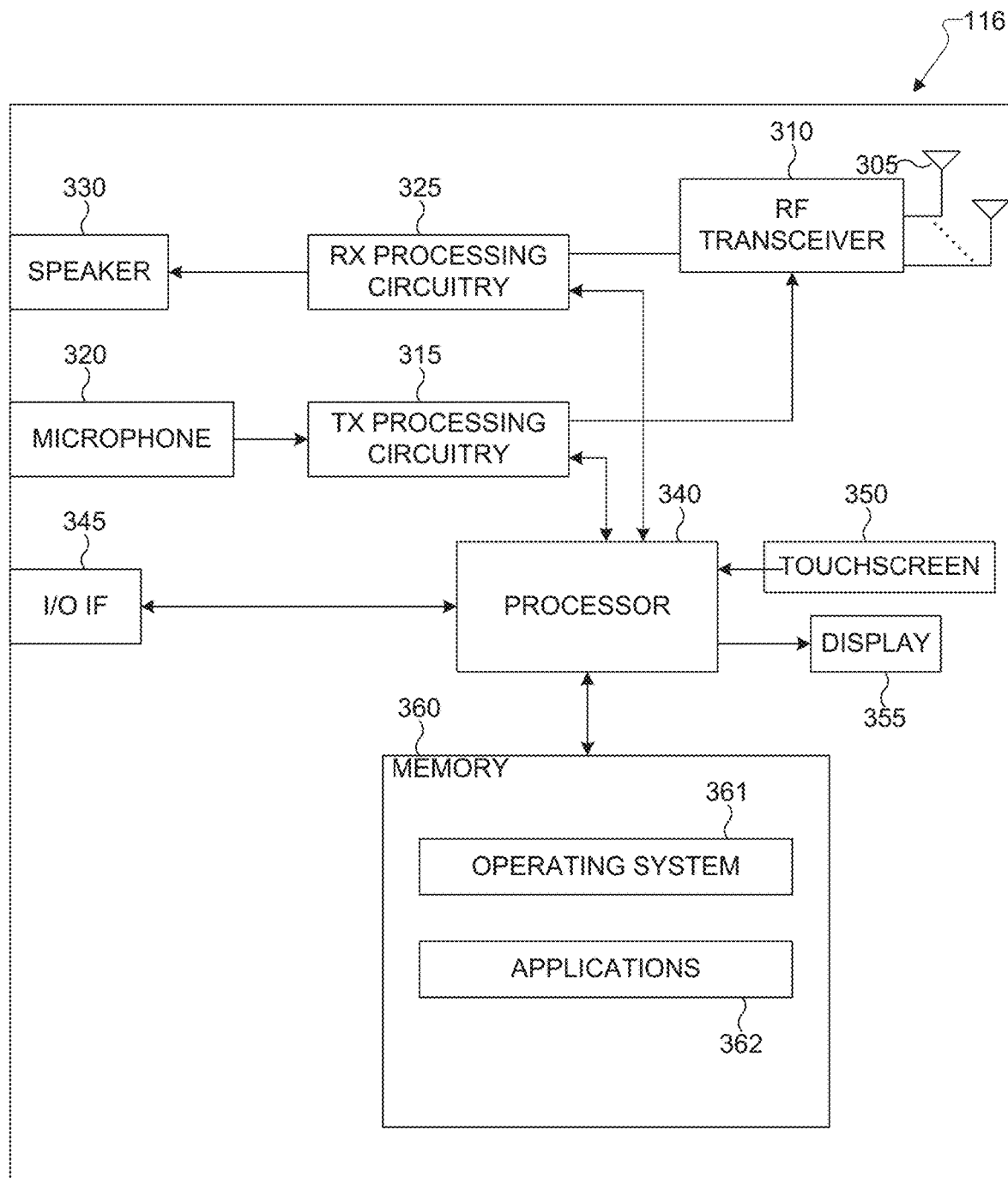
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB or gNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient beam codebook generation for 5G terminal. In certain embodiments, and one or more of the gNBs 101-103 includes circuitry, programing, or a combination thereof, for efficient beam codebook generation for 5G terminals.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
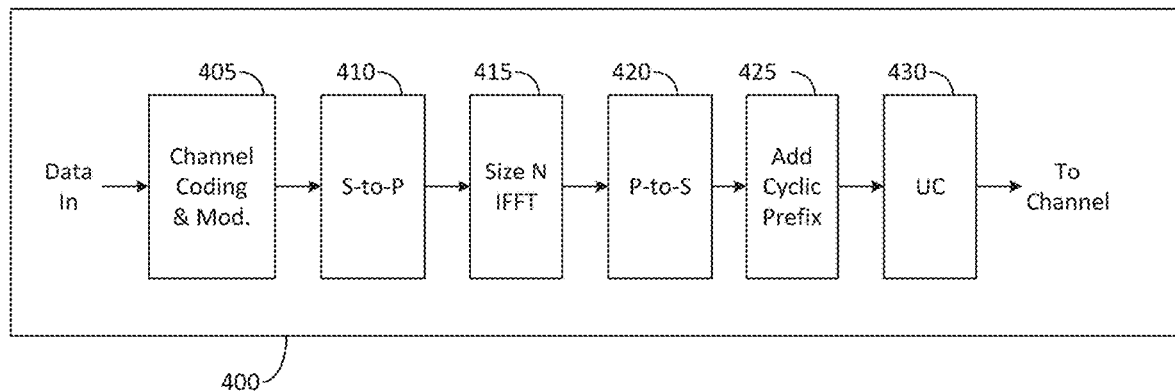
FIG. 4A illustrates a high-level diagram of an orthogonal frequency division multiple access transmit path according to embodiments of the present disclosure.
Figure 4B:
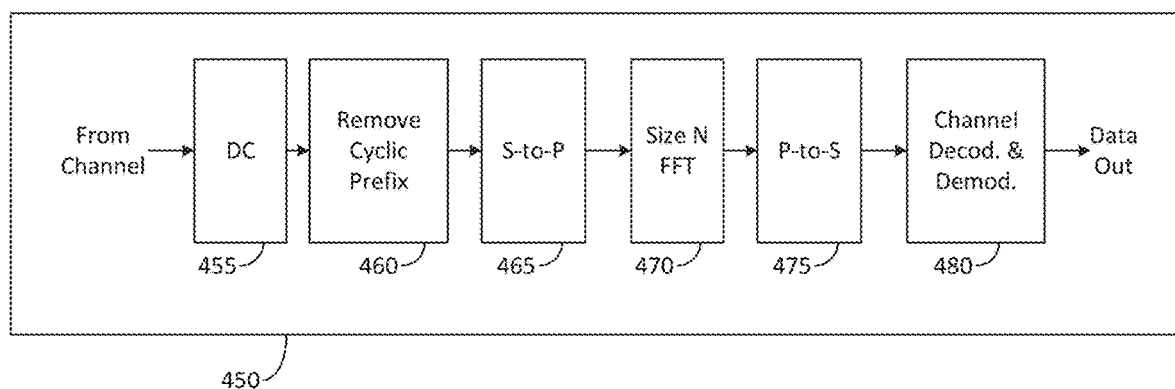
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB or gNB) 102 or a relay station, and the receive path circuitry may be implemented in a user equipment (e.g. user equipment 116 of FIG. 1). In other examples, for uplink communication, the receive path circuitry 450 may be implemented in a base station (e.g. gNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a downlink (DL) that conveys signals from transmission points such as base stations (B Ss) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB (eNB). For 5G systems, a NodeB is referred to as gNodeB. The present disclosure does not limit a usage of eNB or gNB in types of wireless communication systems.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the BCCH conveys a master information block (MIB) or to a DL shared channel (DL-SCH) when the BCCH conveys a system information block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M\_\{PDSCH\}$ RBs for a total of $M_{sc}^{PDSCH}=M_{PDSCH} \cdot N_{sc}^{RB}$ for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$ where $N_{SRS}=1$ if a last subframe symbol is used to transmit SRS and $N_{SRS}=0$ otherwise.

Figure 5:
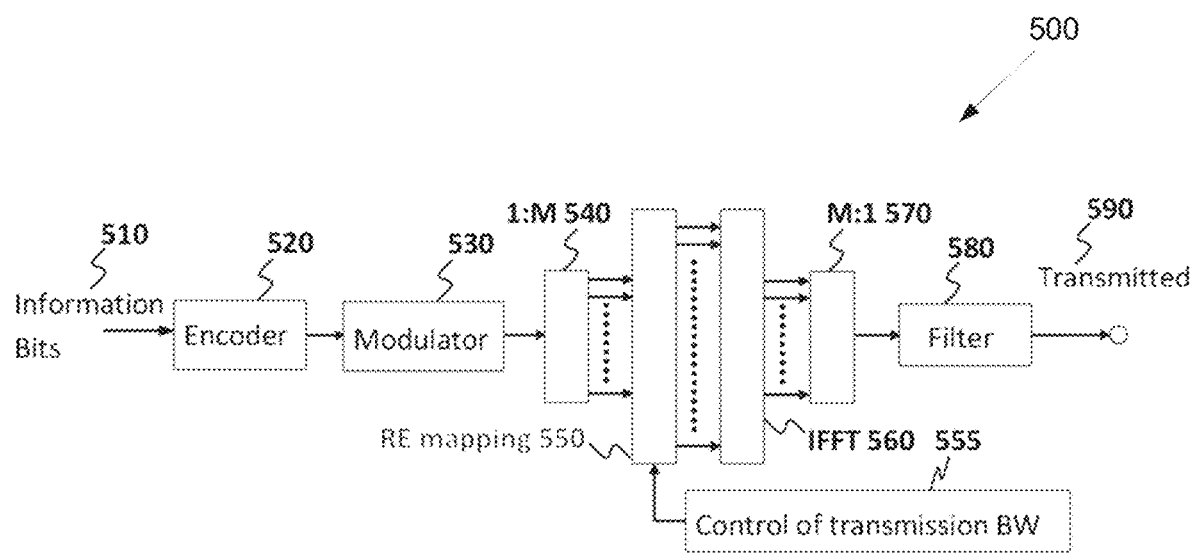
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a channel encoder (e.g., turbo encoder for LTE and/or LDPC encoder for NR), and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
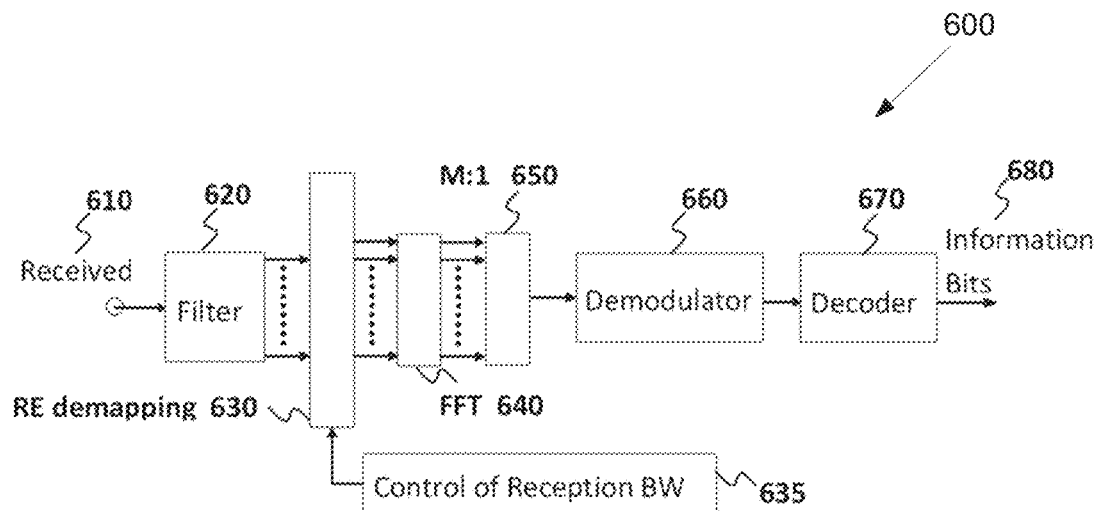
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
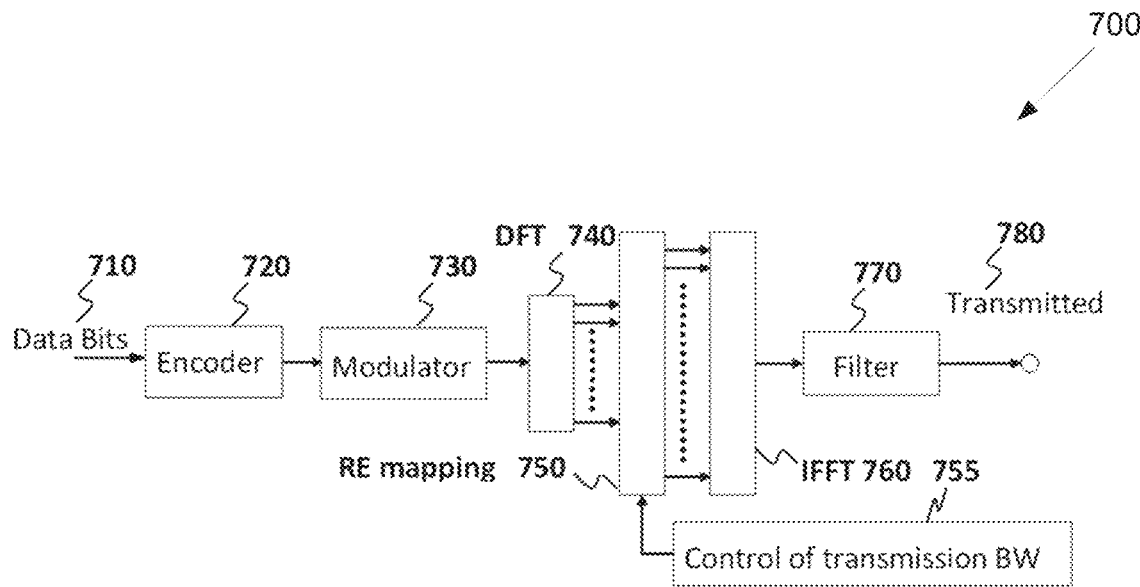
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
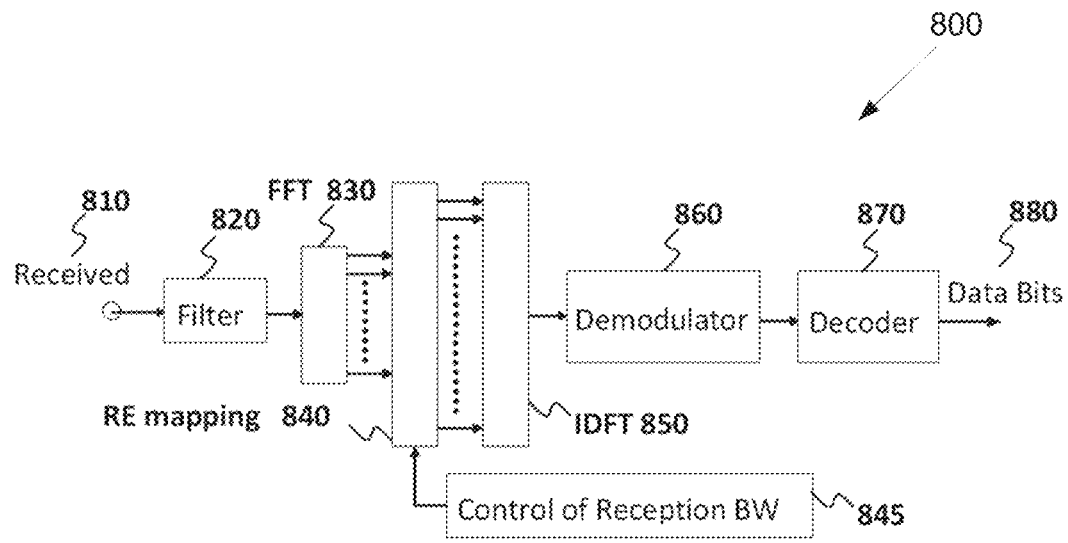
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a channel decoder (e.g., turbo decoder for LTE and/or LDPC decoder for NR), decodes the demodulated data to provide an estimate of the information data bits 880.

In order for the 5G network to support such diverse services with different quality of services (QoS), one embodiment has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
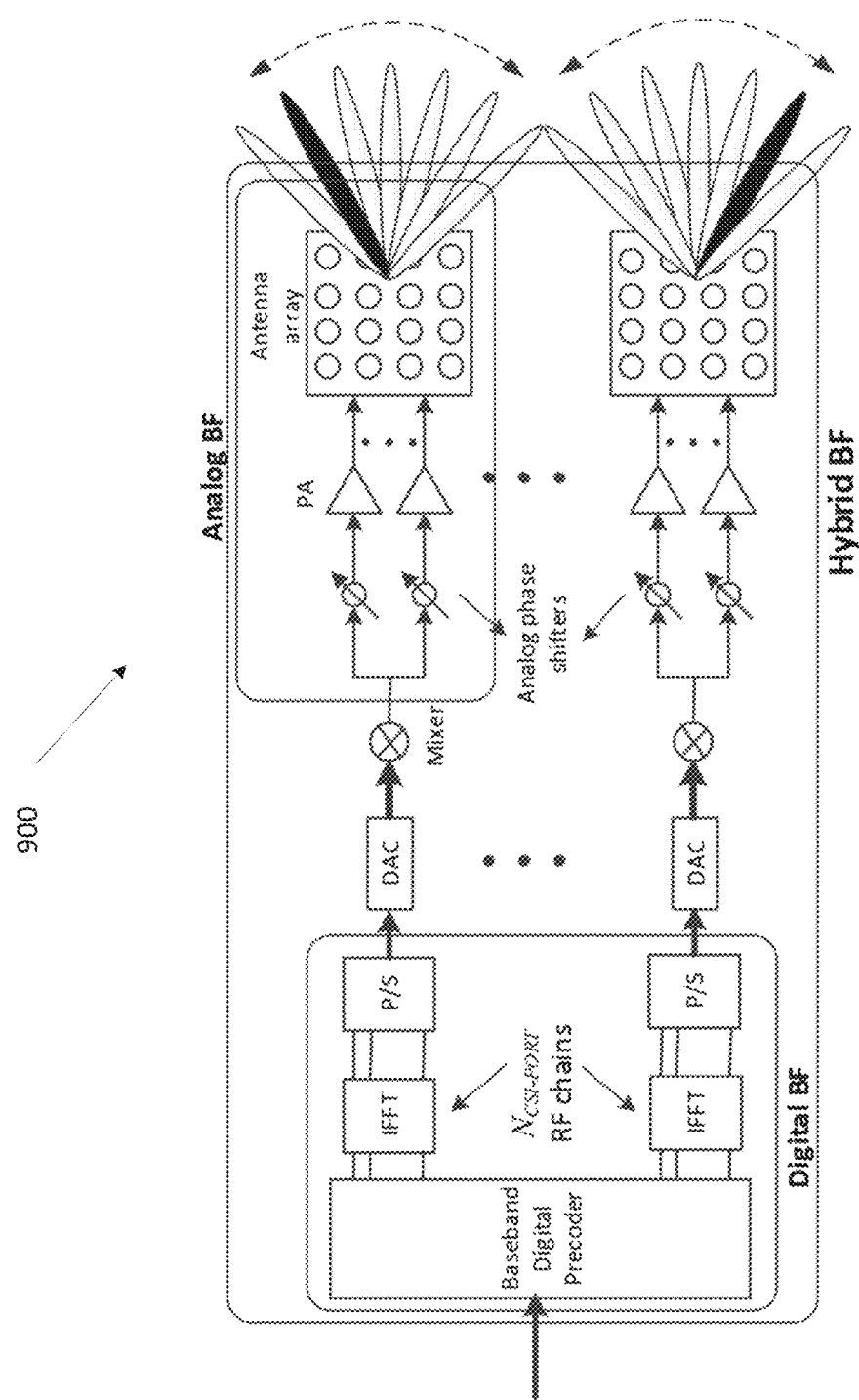
FIG. 9 illustrates an example antenna block according to embodiments of the present disclosure.

FIG. 9 illustrates an example antenna blocks 900 according to embodiments of the present disclosure. The embodiment of the antenna blocks 900 illustrated in FIG. 9 is for illustration only. FIG. 9 does not limit the scope of this disclosure to any particular implementation of the antenna blocks 900.

Figure 10:
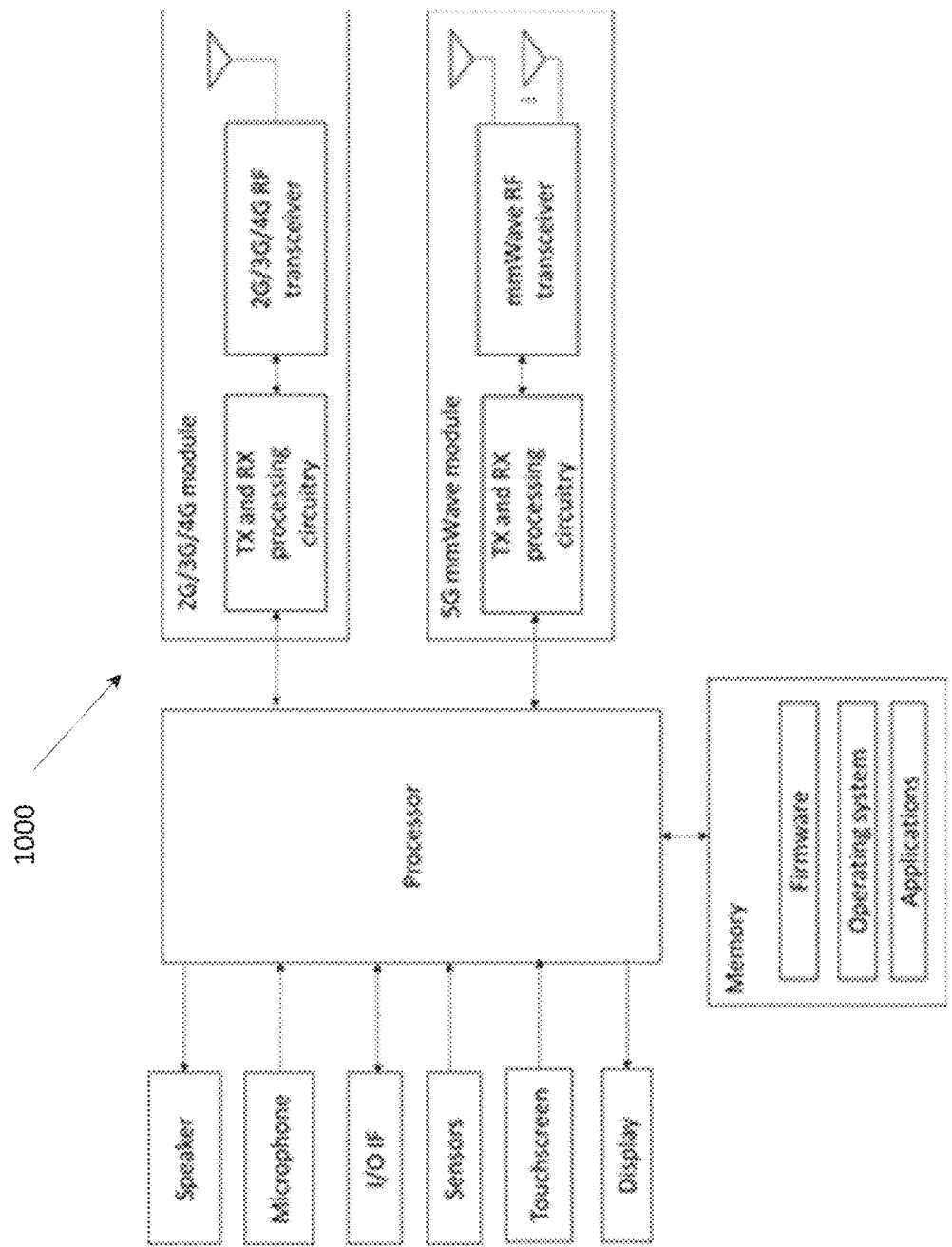
FIG. 10 illustrates an example user equipment according to embodiments of the present disclosure.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In LTE, a number of CSI reporting modes exist for both periodic (PUCCH-based) and aperiodic (PUSCH-based) CSI reporting. Each CSI reporting mode is depend on (coupled with) many other parameters (e.g. codebook selection, transmission mode, eMIMO-Type, RS type, number of CRS or CSI-RS ports). At least two drawbacks can be perceived. First, complex "nested loops" (IF . . . ELSE . . . ) and webs of couplings/linkages exist. This complicates testing efforts. Second, forward compatibility is limited especially when new features are introduced.

While the above drawbacks apply to DL CSI measurement, the same can be said for UL CSI measurements. In LTE, UL CSI measurement framework exists in a primitive form and is not as evolved as DL counterpart. In the advent of TDD or reciprocity-based systems for next generation systems along with the likely prominence of OFDMA or OFDMA-based multiple access for UL, a same (or at least similar) CSI measurement and reporting framework applicable for both DL and UL is beneficial.

To assist the UE in determining RX and/or TX beam of the UE, a beam sweeping procedure is employed consisting of the gNB transmitting a set of transmit beams to sweep the cell area and the UE measuring the signal quality on different beams using the UE's receive beams. To facilitate candidate beam identification, beam measurement and beam quality reporting, the gNB configures the UE with one or more RS resource (e.g. SS Block, Periodic/Aperiodic/Semi-Persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE reports different TX beams received using that RX beam, ranked in order of signal strength (RSRP) and optionally CSI (CQI/PMI/RI)). Based on the UE's measurement report feedback, the gNB configures the UE with a set of Tx beams for reception of PDCCH and/or PDSCH.

FIG. 10 illustrates an example user equipment 1000 according to embodiments of the present disclosure. The embodiment of the user equipment 1000 illustrated in FIG. 10 is for illustration only. FIG. 10 does not limit the scope of this disclosure to any particular implementation.

As shown in FIG. 10, the UE includes a 2G/3G/4G communication module and a 5G mmWave communication module. Each communication module includes one or more antennas, one radio frequency (RF) transceiver, transmit (TX) and receive (RX) processing circuitry. The UE also includes a speaker, a processor, an input/output (I/O) interface (IF), one or more sensors (touch sensor(s), proximity sensor(s), gyroscope, etc.), a touchscreen, a display, and a memory. The memory includes, a firmware, an operating system (OS) and one or more applications.

The RF transceiver receives, from the antenna, an incoming RF signal transmitted by an eNB/gNB of the network. The RF transceiver down-converts the incoming RF signal to generate an intermediate frequency (IF) or baseband signal. The IF or baseband signal is sent to the RX processing circuitry, which generates a processed baseband signal by filtering, decoding, and/or digitizing the baseband or IF signal. The RX processing circuitry transmits the processed baseband signal to the processor for further processing (such as for voice or web browsing data).

The TX processing circuitry receives outgoing baseband data (such as voice, web data, e-mail, or interactive video game data) from the processor. The TX processing circuitry encodes, multiplexes, and/or digitizes the outgoing baseband data to generate a processed baseband or IF signal. The RF transceiver receives the outgoing processed baseband or IF signal from the TX processing circuitry and up-converts the baseband or IF signal to an RF signal that is transmitted via the antenna The processor can include one or more processors and execute the basic OS program stored in the memory in order to control the overall operation of the UE. In one such operation, the main processor controls the reception of forward channel signals and the transmission of reverse channel signals by the RF transceiver, the RX processing circuitry, and the TX processing circuitry in accordance with well-known principles. The main processor can also include processing circuitry configured to allocate one or more resources.

For example, the processor can include allocator processing circuitry configured to allocate a unique carrier indicator and detector processing circuitry configured to detect a physical downlink control channel (PDCCH) scheduling a physical downlink shared channel (PDSCH) reception of a physical uplink shared channel (PUSCH) transmission in one of the carriers. downlink control information (DCI) serves several purposes and is conveyed through DCI formats in respective PDCCHs. For example, a DCI format may correspond to a downlink assignment for PDSCH receptions or to an uplink grant for PUSCH transmissions. In some embodiments, the processor includes at least one microprocessor or microcontroller.

The processor is also capable of executing other processes and programs resident in the memory, such as operations for inter-eNB/gNB coordination schemes to support inter-eNB/gNB carrier aggregation. It should be understood that inter-eNB/gNB carrier aggregation can also be referred to as dual connectivity. The processor can move data into or out of the memory as required by an executing process. In some embodiments, the processor is configured to execute a plurality of applications, such as applications for MU-MIMO communications, including obtaining control channel elements of PDCCHs.

The processor can operate the plurality of applications based on the OS program or in response to a signal received from an eNB/gNB. The main processor is also coupled to the I/O interface, which provides UE with the ability to connect to other devices such as laptop computers and handheld computers. The I/O interface is the communication path between these accessories and the main controller.

The processor is also coupled to the touchscreen and the display. The operator of the UE can use the touchscreen to enter data into the UE. The display may be a liquid crystal display, light emitting diode display, or other display capable of rendering text and/or at least limited graphics, such as from web sites.

The memory is coupled to the processor. Part of the memory could include a random access memory (RAM), and another part of the memory could include a Flash memory or other read-only memory (ROM).

Although FIG. 10 illustrates one example of UE, various changes may be made to FIG. 10. For example, various components in FIG. 10 could be combined, further subdivided, or omitted and additional components could be added according to particular needs. As a particular example, the processor could be divided into multiple processors, such as one or more central processing units (CPUs) and one or more graphics processing units (GPUs). Also, while FIG. 10 illustrates the UE configured as a mobile telephone or smartphone, UEs could be configured to operate as other types of mobile or stationary devices.

A 5G terminal or a UE can be equipped with multiple antenna elements. Beamforming is an important factor when UE tries to establish a connection with a BS station. To compensate for the narrower analog beamwidth in mmWave, analog beams sweeping can be employed to enable wider signal reception or transmission coverage for the UE. A beam codebook comprises a set of codewords, where a codeword is a set of analog phase shift values, or a set of amplitude plus phase shift values, applied to the antenna elements, in order to form an analog beam. The present disclosure describes the beam codebook generation procedure and the algorithms to generate a beam codebook to meet a given set of requirements and performance criteria.

One purpose of codebook design is to provide the optimal coverage for a UE. There is an upper bound of the spherical coverage determined by antenna element E-field radiation data. The upper bound provides a good reference for evaluation of codebook design schemes. For example, the number of beams required for the composite pattern to approach the upper bound can be evaluated.

In one embodiment, the upper bound is computed across the whole sphere. As an example, the whole sphere consists of 180×360 samples along the azimuth (360 samples) and elevation domain (180 samples). Each sample corresponds to one direction. For each direction on the sphere, a gain is computed by maximizing over beamforming weights. Two upper bounds are considered. For the first upper bound, the beamforming weights are subject to sum power constraint; whereas for the second upper bound, the beamforming weights are subject to per-element power constraint.

Assume there are L antenna elements. Let $\varepsilon_l^\theta$ and $\varepsilon_l^\varphi$, $l \in \{1, 2, \ldots, L\}$, denote the complex-valued E field of l-th antenna element for the $\theta$ component and the $\varphi$ component, respectively. Let $w=[w_1, w_2, \ldots, w_L]^T$ denote the complex-valued weights applied on the antenna elements. The E-fields for the $\theta$ component and the $\varphi$ component after applying the beamforming weights are given by $\varepsilon^\theta(w) = \sum_l^L \varepsilon_l^\theta w_l$.

The gain corresponding to the beamforming weights is given by $G(w) \propto |\varepsilon^\theta(w)|^2 + |\varepsilon^\varphi(w)|^2 = w^H(e_\theta{}^c e_\theta{}^T + e_\varphi{}^c e_\varphi{}^T)w$ where $e_\theta = [\varepsilon_1^\theta, \varepsilon_2^\theta, \ldots, \varepsilon_L^\theta]^T$ and $e_\varphi = [\varepsilon_1^\varphi, \varepsilon_2^\varphi, \ldots, \varepsilon_L^\varphi]^T$, $(\bullet)^c$ denotes the conjugate, $(\bullet)^T$ denotes the transpose, and $(\bullet)^H$ denotes the conjugate transpose or Hermitian conjugate.

The upper bound for gain, $\mathcal{B}$, is derived with the optimal w such that $G(w)$ is maximized: $\mathcal{B} = \max_w w^H(e_\theta{}^c e_\theta{}^T + e_\varphi{}^c e_\varphi{}^T)w$.

The upper bound with a sum power constraint can be formulated as $$\mathcal{B}^1 = \max_w w^H(e_\theta^c e_\theta^T + e_\varphi^c e_\varphi^T)w$$
$$\text{s.t.} \|w\| \leq 1$$

It is defined that an auxiliary matrix M as $M \triangleq e_\theta^c e_\theta^T + e_\varphi^c e_\varphi^T$.

It follows that $\mathcal{B}^1$ is given by the maximum eigenvalue of M, $\mathcal{B}^1 = \max\{\lambda(M)\}$ where $\lambda(\cdot)$ denotes the eigenvalue computation and the optimal w for $\mathcal{B}^1$, denoted as $w_{opt}^1$, is the eigenvector corresponding to the maximum eigenvalue of M, i.e. $(w_{opt}^1)^H M w_{opt}^1 = \max\{\lambda(M)\}$.

The upper bound with power constraint per antenna element can be formulated as $$\mathcal{B}^2 = \max_w w^H(e_\theta^c e_\theta^T + e_\varphi^c e_\varphi^T)w$$

$$s.t. |w_l| = 1/\sqrt{L}, 1 \leq l \leq L.$$

In one embodiment of initialization, initialize the complex-number weights $w^0$ where the superscript denotes the 0-th iteration step. In an example, but not limited to this example, $W^0$ is configured to be $W^0 = [1, 1, \ldots, 1]/\sqrt{L}$.

In one example of Step 1, updates the weight imposed on each antenna element $w_l^k$ for all l's sequentially $w_l^k = f(\Sigma_{i \neq l}^L w_l^{k-1} M(i,l))$ where $w_l^k$ is the weight on the l-th antenna element at k-th iteration, and $f(x)$ is defined as follows, $$f(x) = \begin{cases} 1 & x = 0 \\ \dfrac{x}{|x|} & x \neq 0 \end{cases}.$$

In one example of Step 2, calculate the iteration stopping condition variable $\gamma^k$, $$\gamma^k = \frac{(w^k)^H M w^k - (w^{k-1})^H M w^{k-1}}{(w^k)^H M w^k}.$$

In one example of Step 3, if $\gamma^k$ is smaller than a predefined threshold, $\varepsilon$, the iteration stopping condition is satisfied and the optimal weights $w_{opt}^2$ is given by the final $w^k$ and $\mathcal{B}^2 = (w_{opt}^2)^H M w_{opt}^2$.

Else if $\gamma^k$ is larger than $\varepsilon$, go to Step 1. If the stopping condition is not satisfied after a predetermined maximum number of iterations, convergence is not achieved within the maximum number of iterations tolerable and the algorithm is terminated. If there are multiple antenna modules, upper bounds of individual can still be obtained as above. The overall upper bound can be defined based on the individual upper bounds, for example, maximization over the individual upper bounds.

Figure 11:
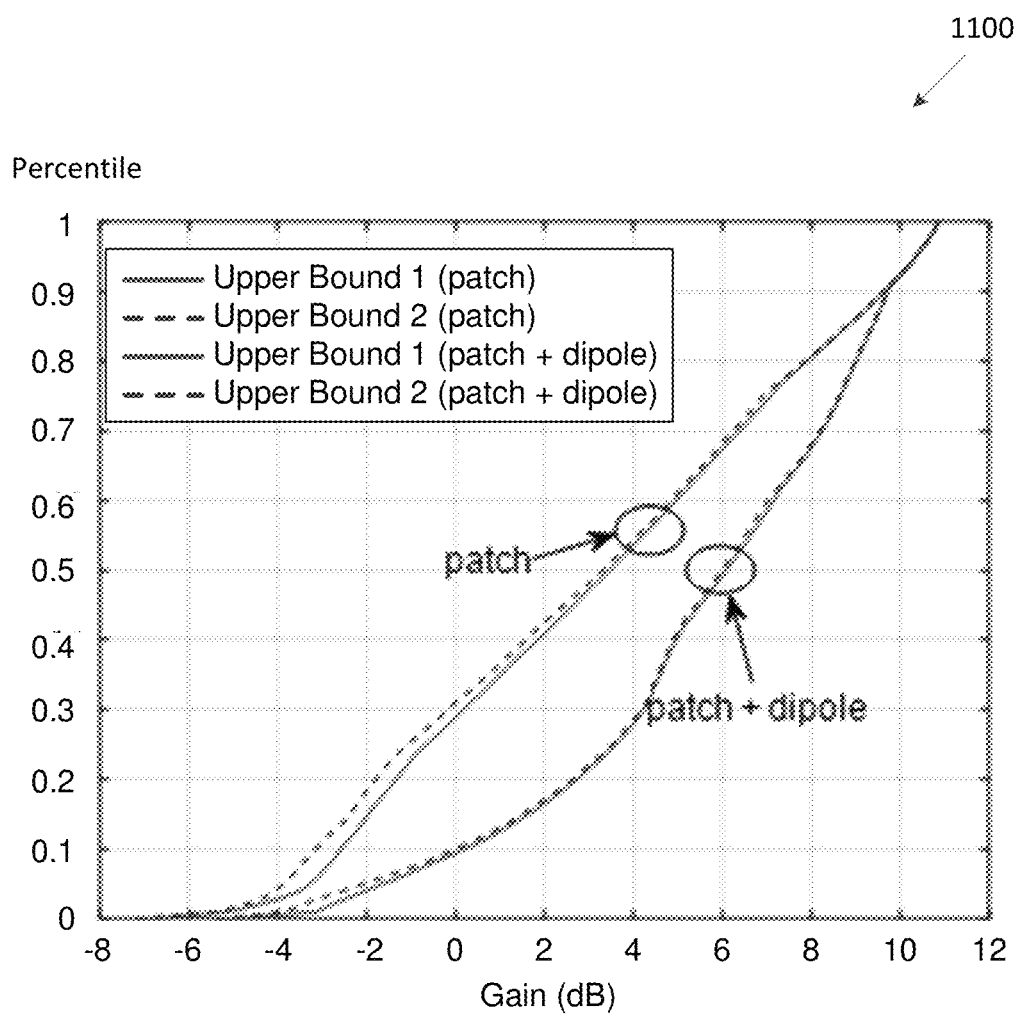
FIG. 11 illustrates an example upper bound for single and multi-array according to embodiments of the present disclosure.

FIG. 11 illustrates an example upper bound 1100 for single and multi-array according to embodiments of the present disclosure. The embodiment of the upper bound 1100 illustrated in FIG. 11 is for illustration only. FIG. 11 does not limit the scope of this disclosure to any particular implementation.

A comparison of the upper bounds in EIRP CDF for single and multiple arrays for an example antenna module is plotted in FIG. 11. TABLE 1 shows that patch+dipole provides gains of 35.59% and 33.47% for 50%-tile and 20%-tile, respectively, compared to patch only.

TABLE 1

Comparison of patch and patch + dipole for Upper Bound 1

| Array | Peak (dB) | Drop from peak (dB) | |
|---|---|---|---|
| | | 50%-tile | 20%-tile |
| Patch | 10.86 | 10.86 − 3.47 = 7.39 dB | 10.86 − (−1.33) = 12.19 dB |
| Patch + dipole | 10.86 | 10.86 − 6.10 = 4.76 dB (−35.59%) | 10.86 − 2.75 = 8.11 dB (−33.47%) |

A good beam codebook design depends on many factors including: antenna element type and gain (e.g. isotropic, dipole, microstrip patch); array size and layout (e.g. linear, rectangular, circular); requirements of codebook (e.g. codebook size); and/or consideration about housing and display in set-level.

It is generally difficult to find an analytical scheme to generate the codebook. Therefore, a heuristic scheme is provided, which can be used for all possible element E-field data and array layout. The overall procedure is illustrated in FIG. 12.

Figure 12:
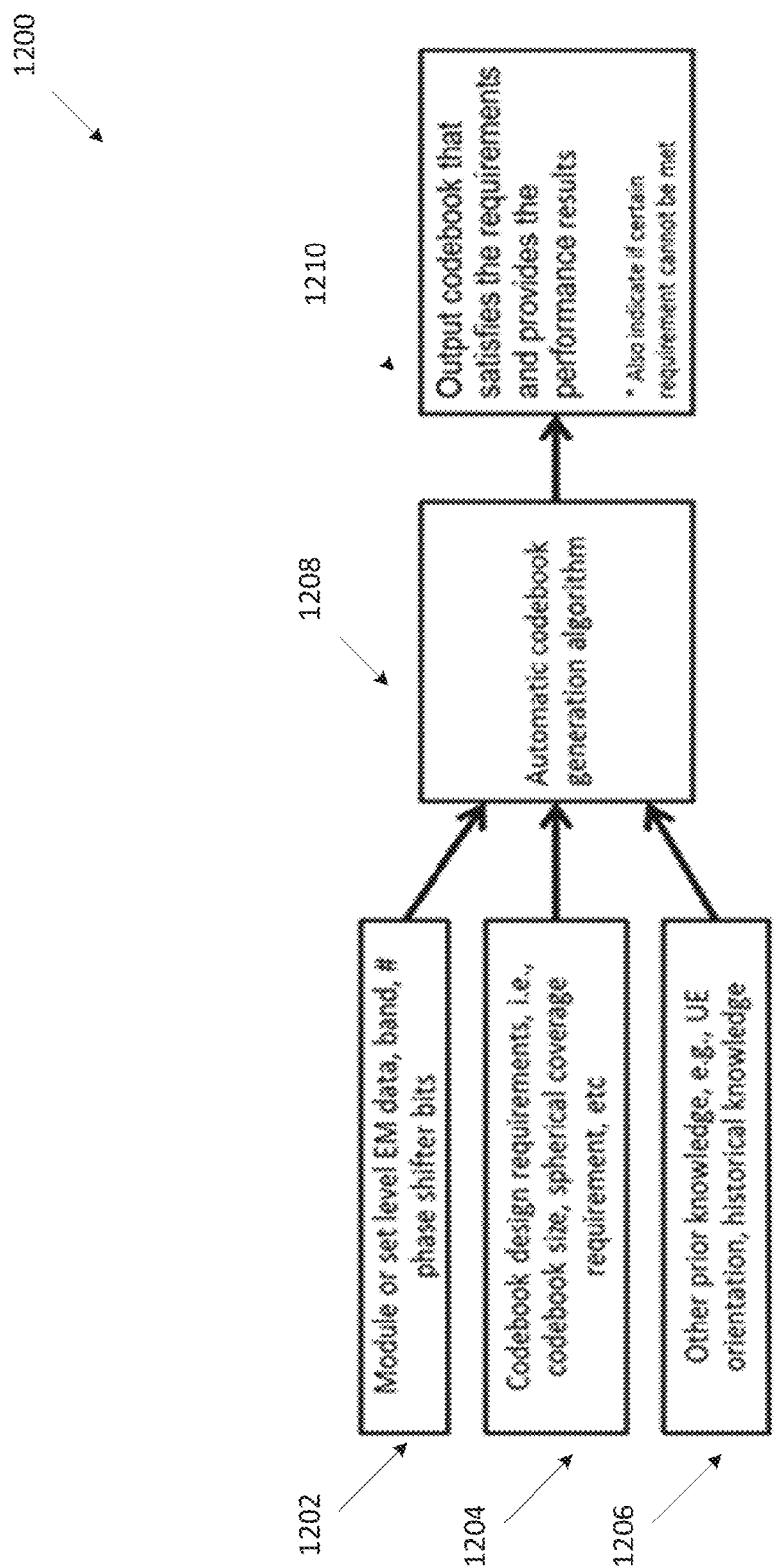
FIG. 12 illustrates an example automatic codebook generation according to embodiments of the present disclosure.

FIG. 12 illustrates an example automatic codebook generation 1200 according to embodiments of the present disclosure. The embodiment of the automatic codebook generation 1200 illustrated in FIG. 12 is for illustration only. FIG. 12 does not limit the scope of this disclosure to any particular implementation.

As illustrated in FIG. 12, in step 1202, at least one of a module of set level EM data, a band, or a number of phase shifter bits is sent to an automatic codebook generation algorithm in step 1208. In step 1202, codebook design requirements comprising at least one of a codebook size, or spherical coverage requirements are sent to the automatic codebook generation algorithm in step 1208. Similarly, in step 1206, other prior knowledge comprising at least one of a UE orientation or historical knowledge is sent to the automatic codebook generation algorithm in step 1208. In step 1208, the automatic generation algorithm outputs an output codebook that satisfies the requirements and provides the performance results in step 1210.

Figure 13:
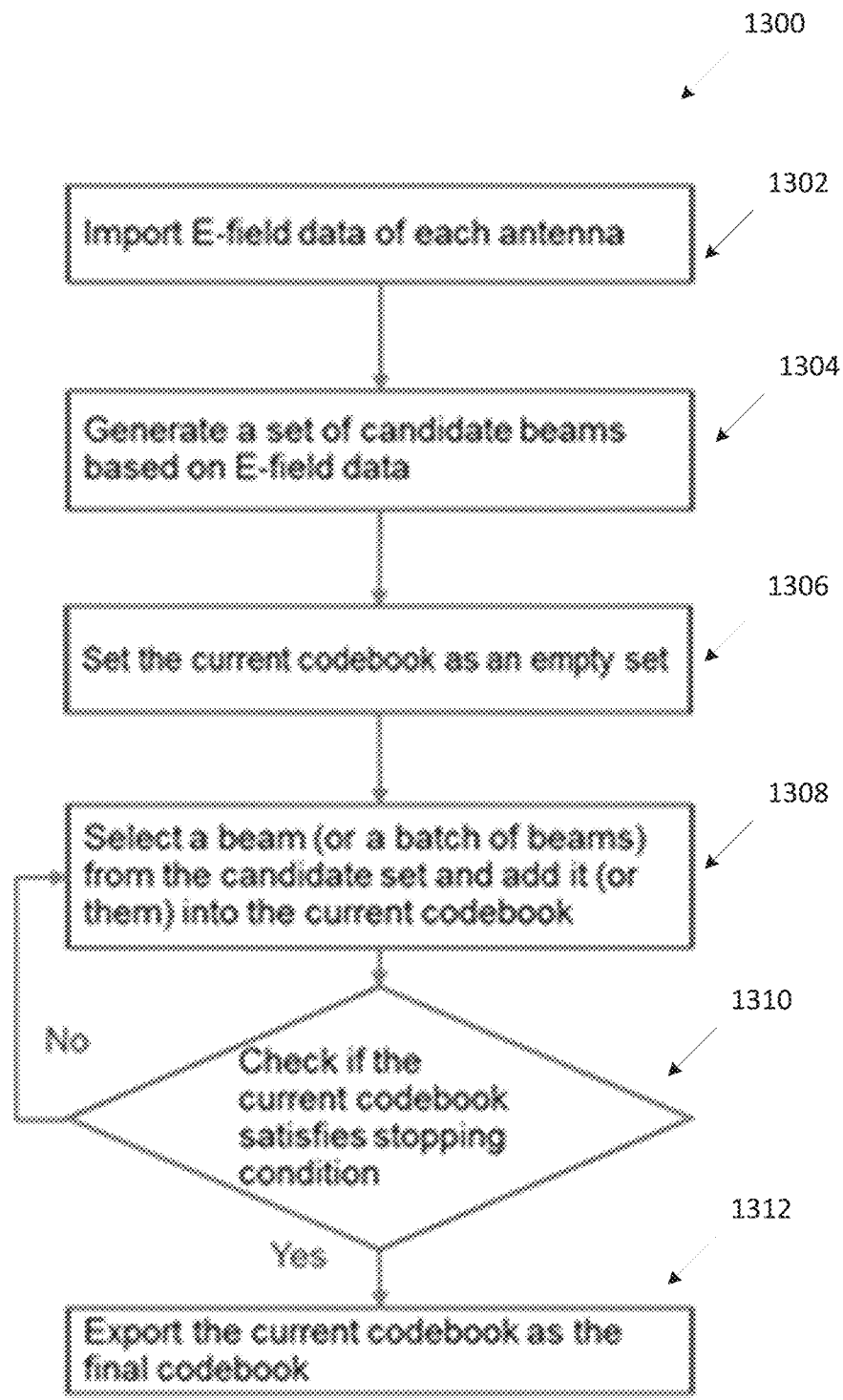
FIG. 13 illustrates a flow chart of a heuristic scheme according to embodiments of the present disclosure.

FIG. 13 illustrates a flow chart of a heuristic scheme 1300 according to embodiments of the present disclosure. The embodiment of the heuristic scheme 1300 illustrated in FIG. 13 is for illustration only. FIG. 13 does not limit the scope of this disclosure to any particular implementation.

The main steps of the heuristic scheme are as follows and are shown in FIG. 13. In one example of Step 0, import E-field data of module-level antenna design from measurement or simulation. In one example of Step 1, generate candidate beam codewords according to configured codebook type. In such example, applicable codebook types depend on beam codebook generation algorithm. In one example of Step 2, select beams from the candidate set according to a certain performance criterion. In such example, performance criterion depends on detailed beam codebook generation algorithm design. In one example of Step 3, stop if a certain stopping criterion is met; repeat Step 2 otherwise, stopping criterion depends on user inputs on codebook design requirements (codebook size or spherical coverage requirement).

As illustrated in FIG. 13, at step 1302, E-field data of each antenna is imported. At step 1304, a set of candidate beams are generated based on the E-field date. At step 1306, the current codebook is set as an empty set. At step 1308, a beam (or a batch of beams) is selected from the candidate set and add the beam (or beams) into the current codebook. At step

1310, it is determined if the current codebook satisfies stopping condition. If the current codebook satisfies the condition, the current codebook is exported as the final codebook at step 1312. At step 1310, the current code does not satisfy stopping condition, step 1308 is performed.

The candidate codeword set is designed be large enough to cover the whole sphere (or a certain required coverage region) to avoid coverage holes. Options of the candidate set considered are but not limited as follows. In one example of Option 1, Eigen-based candidate set, with sum power constraint or with per-antenna element power constraint. In this option, the candidate set is taken from the eigenvectors that maximize radiation gain. In one example of Option 2, M×N DFT candidate set. (M, N) are determined by the number of phase shifter, antenna dimensions. In one example of Option 3, uniformly distributed beams on the sphere, i.e., the beam pointing to a set of uniformly distributed directions on the sphere. In one example of Option 4, beams with random phases at i-th element, defined as $\varphi_i \sim U(0, 2\pi)$ or $(2\pi)/2^b * U\{0, 2^b-1\}$) if the phase shifter has limited resolution as bits.

The provided codebook design scheme is applicable for hardware implementation. To implement the designed codebook, the hardware requirements considered are listed but not limited to the items below: module-level or set-level; for set-level, the number of antenna modules, their locations and their orientation in the device; the number of bits for the phase shifter (e.g. 3, 4, 5); supported band, for example, 28 GHz, 39 GHz or both; supported bandwidth (low/wide/high); MIMO capability: diversity/multiplexing; gain control capability; and residual error in RF calibration & housing/assemble dimensions deviation.

The possible beam codebook requirements are listed below: codebook size, e.g. 16 beams; spherical coverage CDF requirements such as −Y dB from max EIRP at X %-tile CDF, spatial coverage region in the ranges of azimuth and elevation, and the range of azimuth is configurable from 0° to 360° and the range of elevation is configurable from 0° to 180°. Default is the whole sphere; sidelobe level; and beam width, e.g., 3-dB beam width or half power beam width (HPBW).

Figure 14:
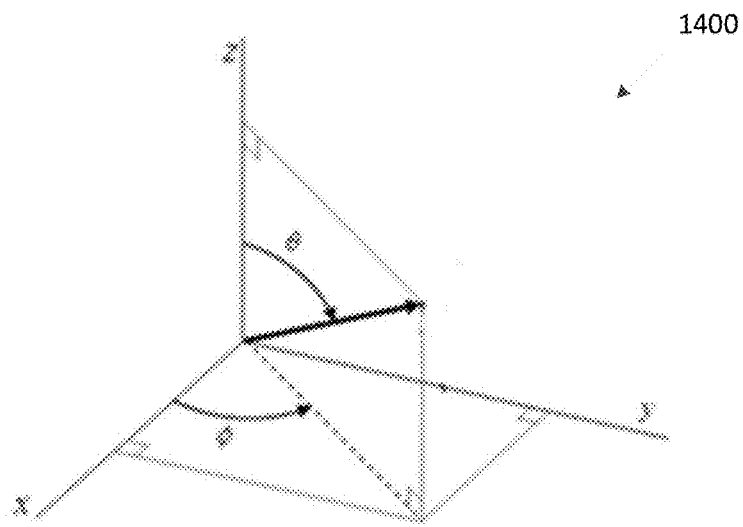
FIG. 14 illustrates an example coordinate system according to embodiments of the present disclosure.

FIG. 14 illustrates an example coordinate system 1400 according to embodiments of the present disclosure. The embodiment of the coordinate system 1400 illustrated in FIG. 14 is for illustration only. FIG. 14 does not limit the scope of this disclosure to any particular implementation.

Optimization criteria need to be defined in order to determine the codeword (beam) selection criterion and/or the algorithm stopping condition. The same or different metrics may be used for performance optimization criterion and the stopping condition criterion.

Performance optimization criterion defines the metric or the objective function that the algorithm tries to maximize/minimize. For the EIRP maximizing greedy algorithm, it is the maximization of EIRP value at X %-tile CDF sampled over a given spatial coverage region (default is the whole sphere). This is described as Y dB droop from the peak EIRP at X %-tile CDF (both X and Y can be configured in the codebook design). Other possible objective function can be the maximization of mean EIRP, i.e. the average EIRP over the given spatial coverage region.

For the uniform beam covering algorithm, it is the minimization of the number of beams required to cover a target spatial region, such that overlapping of beam patterns at the adjacent beam positions at some gain level (e.g. 3 dB below the max gain) is guaranteed.

Stopping condition criterion defines the metric used to terminate the algorithm. The metrics are taken from the codebook design requirements. The codebook size is one embodiment of the criterion. The EIRP value at X %-tile CDF is another embodiment of the criterion, i.e. the algorithm stops after the EIRP value at the X %-tile CDF is reached. Yet another criterion is the spatial coverage region, which is applicable for the uniform beam covering algorithm, i.e. the algorithm stops after a required spatial region has been covered with beams.

Performance of the generated codebook is compared against the upper bound as described in the previous section, in particular the following comparisons with the upper bound(s) are made: spherical coverage or EIRP CDF; 2-D heat map of radiation pattern of the generated codebook and the difference compared to the heat map of the optimal spherical coverage; sidelobe level of the generated beams; and beamwidth, e.g., 3-dB beamwidth or half power beam width (HPBW) of the generated beams.

On the spherical coverage or EIRP CDF, the following metrics are included as the criteria for the codebook design: peak EIRP value; peak−50% drop: difference between the $50^{th}$ percentile EIRP and the peak EIRP; gap to upper bound at $50^{th}$ percentile: the difference between the EIRP of the codebook and the upper bound at the $50^{th}$ percentile; and gap to upper bound at $100^{th}$ percentile: the difference between the EIRP of the codebook and the upper bound at the $100^{th}$ percentile.

Figure 15:
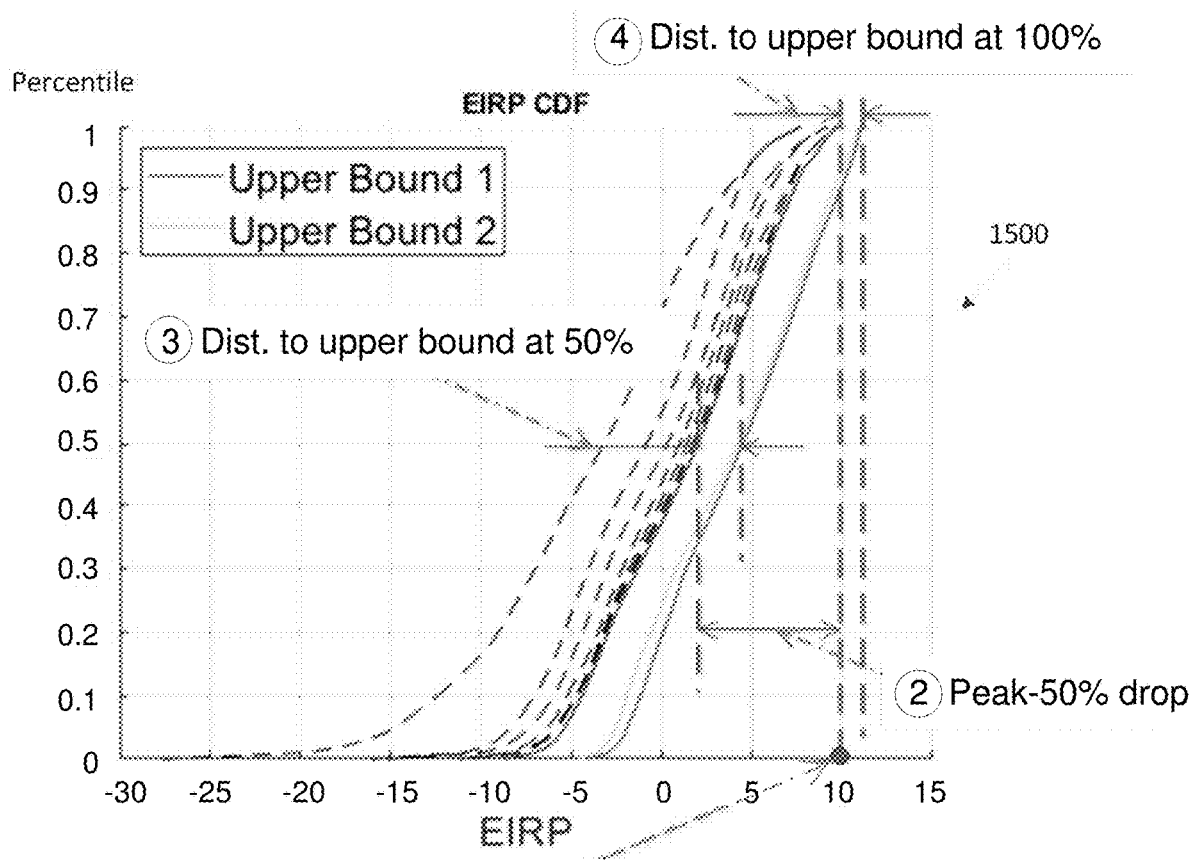
FIG. 15 illustrates an example EIRP CDF and some key metrics according to embodiments of the present disclosure.

The above metrics are illustrated in FIG. 15. FIG. 15 illustrates an example EIRP CDF and some key metrics 1500 according to embodiments of the present disclosure. The embodiment of the EIRP CDF and some key metrics 1500 illustrated in FIG. 15 is for illustration only. FIG. 15 does not limit the scope of this disclosure to any particular implementation.

As illustrated in FIG. 15, the EIRP CDF comprises an upper bound 1 and an upper bound 2. FIG. 15 shows a peak EIRP value at (1), peak 50% drop at (2), a distribution to upper bound—50% at (3), and distribution to upper bound—100% at (4).

Figure 16:
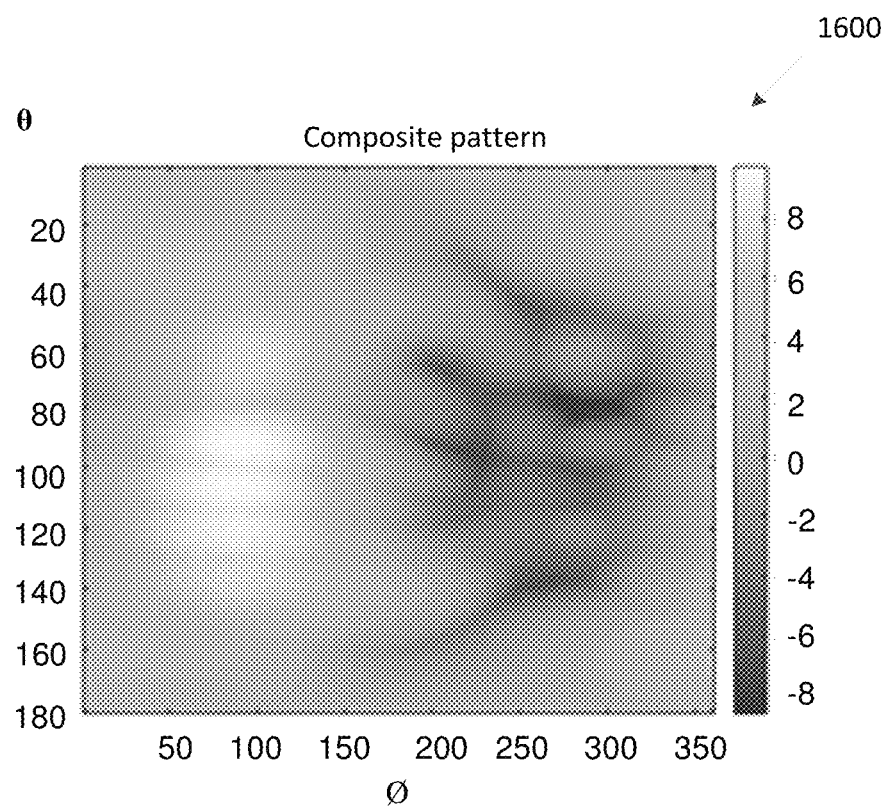
FIG. 16 illustrates an example two-D heat map of spherical coverage of a codebook according to embodiments of the present disclosure.

FIG. 16 illustrates an example two-D heat map 1600 of spherical coverage of a codebook according to embodiments of the present disclosure. The embodiment of the two-D heat map 1600 illustrated in FIG. 16 is for illustration only. FIG. 16 does not limit the scope of this disclosure to any particular implementation. An example 2-D heat map of radiation pattern of a codebook is given in FIG. 15.

Figure 17:
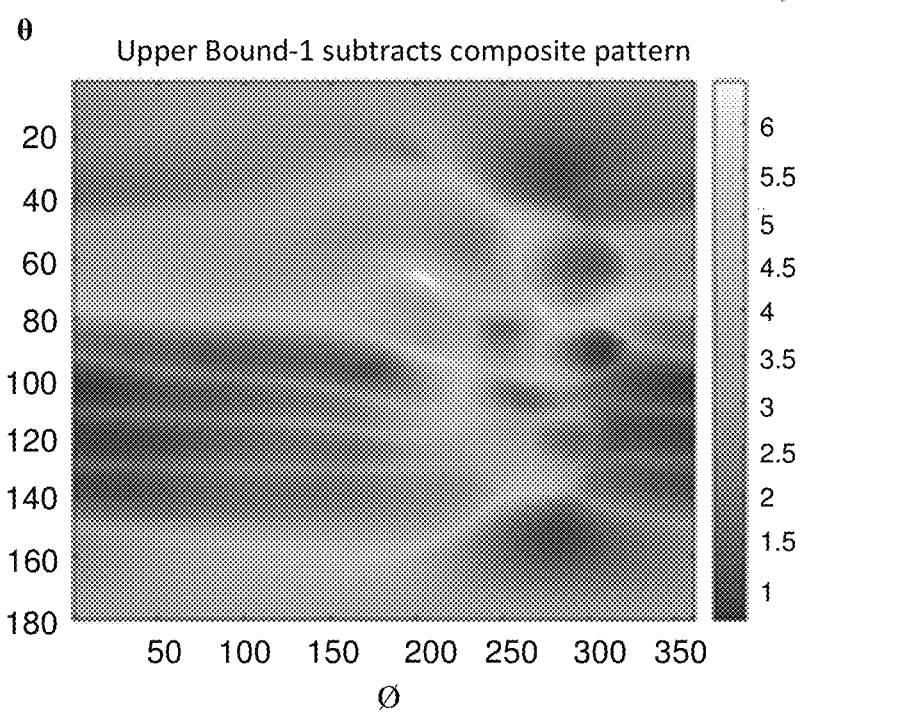
FIG. 17 illustrates an example difference between the radiations of the upper bound and the codebook according to embodiments of the present disclosure.

FIG. 17 illustrates an example difference between the radiations of the upper bound and the codebook 1700 according to embodiments of the present disclosure. The embodiment of the difference between the radiations of the upper bound and the codebook 1700 illustrated in FIG. 17 is for illustration only. FIG. 17 does not limit the scope of this disclosure to any particular implementation.

The difference between the radiations of the upper bound and the codebook can also be generated as a 2-D heat map as shown in FIG. 17.

In this algorithm, the selection maximizes EIRP-related metric (for example, the mean EIRP value or X %-tile of the EIRP CDF) in a greedy manner.

If the selection criteria are the X %-tile EIRP value, the greedy algorithm first selects a beam out of the candidate set, whose CDF has the largest X %-tile EIRP value. Then in each step, the beam which maximizes the X-tile EIRP value of the composite beam is selected. If a requirement on the spatial coverage region is specified, the CDF for beam selection is constructed based on sampling within the specified spatial coverage region.

Figure 18:
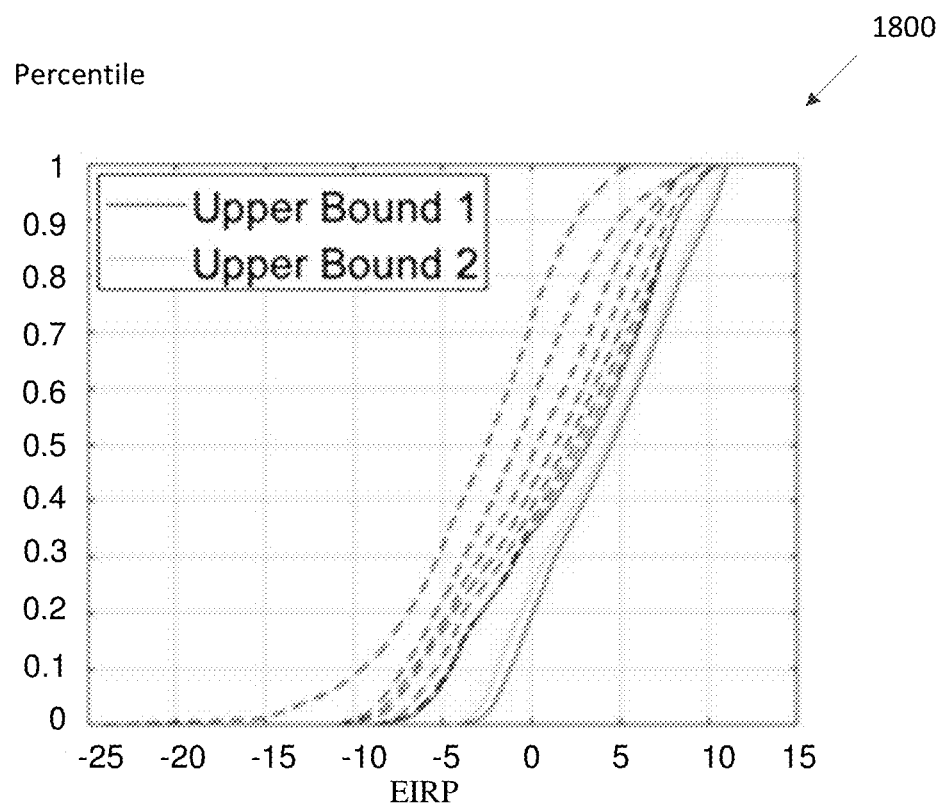
FIG. 18 illustrates an example EIRP CDF of the composite pattern according to embodiments of the present disclosure.

FIG. 18 illustrates an example EIRP CDF 1800 of the composite pattern according to embodiments of the present disclosure. The embodiment of the EIRP CDF 1800 illustrated in FIG. 18 is for illustration only. FIG. 18 does not limit the scope of this disclosure to any particular implementation.

An example result of the greedy algorithm is shown in FIG. 18. The black dash curves represent the improvement in EIRP CDF as each beam is added to the codebook. The blue curve is the EIRP CDF of the final codebook.

Performance criterion is supported for the greedy algorithm. In one example of Option 1, Y dB drop from the peak EIRP at X %-tile CDF over a specified spatial coverage region (azimuth and elevation ranges).

In one example of Option 2, weighted average of configured percentile points over a specified spatial coverage region (azimuth and elevation ranges). Mathematically, it means that the weighted sum $w_1$ f(20)+$w_2$ f(50)+$w_3$ f(80) is maximized where f(x) is the x %-tile gains, and $w_1$ are the weights. Since these three points are equally important in our assumption, $w_1$=$w_2$=$w_3$=1 is chosen. Option 1 is a special case with all but one percentile point set to be zero weight.

In one example of Option 3, mean EIRP in linear domain (i.e. for each iteration, the beam providing the largest gain in mean EIPR in linear domain is selected).

Stopping condition supported for the greedy algorithm includes: codebook size; and performance criterion according to Option 1, 2 or 3 above is satisfied.

The schemes to construct the candidate set of beams or codewords for selection by the greedy algorithm are described later.

The idea of this algorithm is similar to the Lloyd Max algorithm for quantization. Given an initial set of K beams $w_1, w_2, \ldots, w_K$ and a set of interested directions D{$d_1, d_2, d_3, \ldots, d_N$}, the algorithm proceeds by alternating between two steps.

Figure 19:
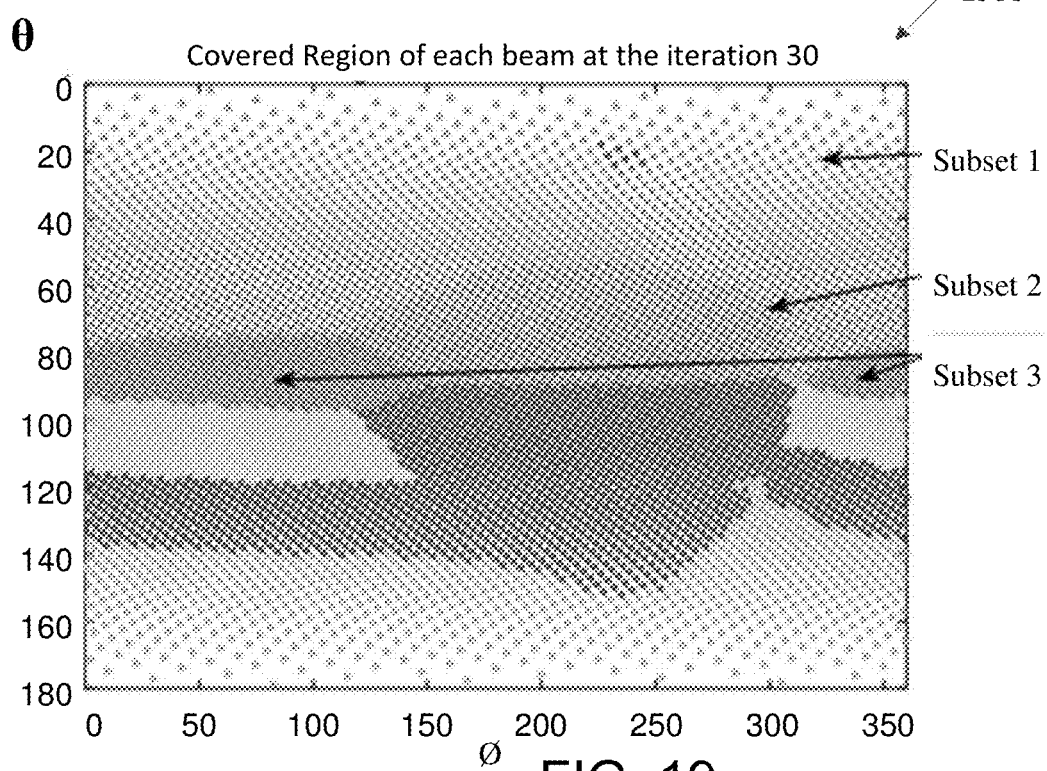
FIG. 19 illustrates an example partitioning the set of directions into subsets according to embodiments of the present disclosure.

FIG. 19 illustrates an example partitioning the set of directions 1900 into subsets according to embodiments of the present disclosure. The embodiment of the partitioning the set of directions 1900 illustrated in FIG. 19 is for illustration only. FIG. 19 does not limit the scope of this disclosure to any particular implementation.

In one embodiment of assignment step, assign each direction to the beam, which has the largest gain. Mathematically, this means partitioning the set of directions D to K subsets, denoted as $S_1, S_2, \ldots S_K$. Each subset is served by a beam. For example, FIG. 19 shows one possible realization. Each circle represents a direction. The circles with same color belong to the same subset.

Figure 20:
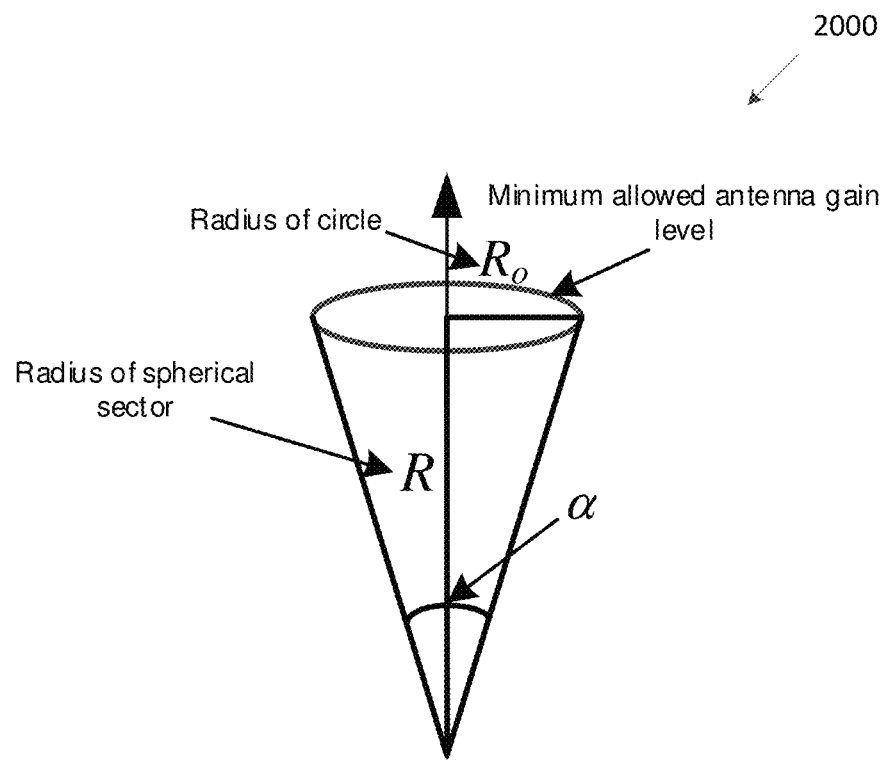
FIG. 20 illustrates an example definition of c which determines the beamwidth according to embodiments of the present disclosure.

FIG. 20 illustrates an example definition of α 2000 which determines the beamwidth according to embodiments of the present disclosure. The embodiment of the definition of α 2000 illustrated in FIG. 20 is for illustration only. FIG. 20 does not limit the scope of this disclosure to any particular implementation.

In one embodiment of update step, optimize a new beam to serve all directions in every subset. This is done by solving the following problem. It is similar to the computation of the $2^{nd}$ upper bound, the only difference is that the problem is solved for only one point for each subset $S_k$ by summing the M(θ, φ)1 matrices for all the points in subset $S_k$. The objective is to maximize the mean gain (in linear scale, not dB), $$\mathcal{B}^2 = \max_w w^H \left( \sum_{(\theta,\varphi) \in S_k} M(\theta, \varphi) \right) w$$
$$\text{s.t.} |w_l| = 1/\sqrt{L}, 1 \le l \le L$$

The algorithm is terminated when the mean gains for all converged or the assignments of beams to $S_k$ no longer change. For the initialization of the codebook {$w_1, w_2, \ldots, w_k$}, possible options include: the initial codebook is generated from the greedy algorithm. In other words, the two algorithms are concatenated. The greedy algorithm first runs and then treat the output of the greedy algorithm as the initial point of the Lloyd-Max algorithm; and the initial codebook is generated by selecting k codewords from the candidate codewords pool. The candidate codewords pool may be Eigen-based codebook, iterative Eigen-based codebook, DFT codebook, uniform grid codebook, random phase codebook, etc. The selection may be done randomly or by following certain metric.

Note that here a pair angle (θ, φ) represents a direction (or a point on the unit sphere), instead of the polarization directions. The algorithm assumes that all the beams have the same beam shape regardless of their directions. The main lobe directions of the beams are decided to cover a required area without holes.

The input parameters of this algorithm include: a determines minimum allowed antenna gain level; and $θ_{sec}$ determines the elevation angle limiting spherical sector and has to be within the range of [0:90°].

There approaches to configuring the value of α in the codebook design include. In one example of scheme 1, α is directly configured. In one example of scheme 2, α is calculated from x-dB beam width configuration. The value of 'x' can be directly configured. Then, a beam width is calculated within which the radiation power falls below the maximum value by no larger than x-dB. Then, the calculated beam width is taken as the α. The x-dB beam width based a calculation follows the four steps below.

In such example: (Step 1) find the direction ($φ_M$, $θ_M$) at which the radiation power achieves the maximum $P_M$; (Step 2) in the plane φ=$φ_M$, find the two boundaries between which the radiation power falls below $P_M$ by no more than x-dB. The angle between the boundary is denoted by $α_1$; (Step 3) calculate the plane which (1) is the orthogonal to the plane φ=$φ_M$, (2) contains the origin, and (3) contains the point ($φ_M$, $θ_M$). On the calculated plane, find the two boundaries between which the radiation power falls below $P_M$ by no more than x-dB. The angle between the boundary is denoted by $α_2$; and Step 4. The smaller one between $α_1$ and $α_2$ is taken as the α for the "uniform beam covering" algorithm, α=min($α_1$, $α_2$).

Figure 21:
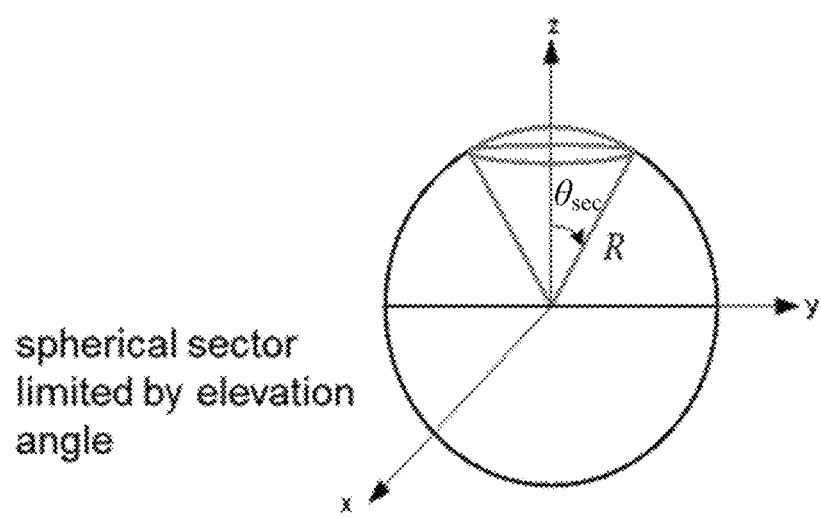
FIG. 21 illustrates an example definition of $\theta_{sec}$ which determines the coverage area according to embodiments of the present disclosure.

FIG. 21 illustrates an example definition of $θ_{sec}$ 2100 which determines the coverage area according to embodiments of the present disclosure. The embodiment of the definition of $θ_{sec}$ 2100 illustrated in FIG. 21 is for illustration only. FIG. 21 does not limit the scope of this disclosure to any particular implementation.

Figure 22:
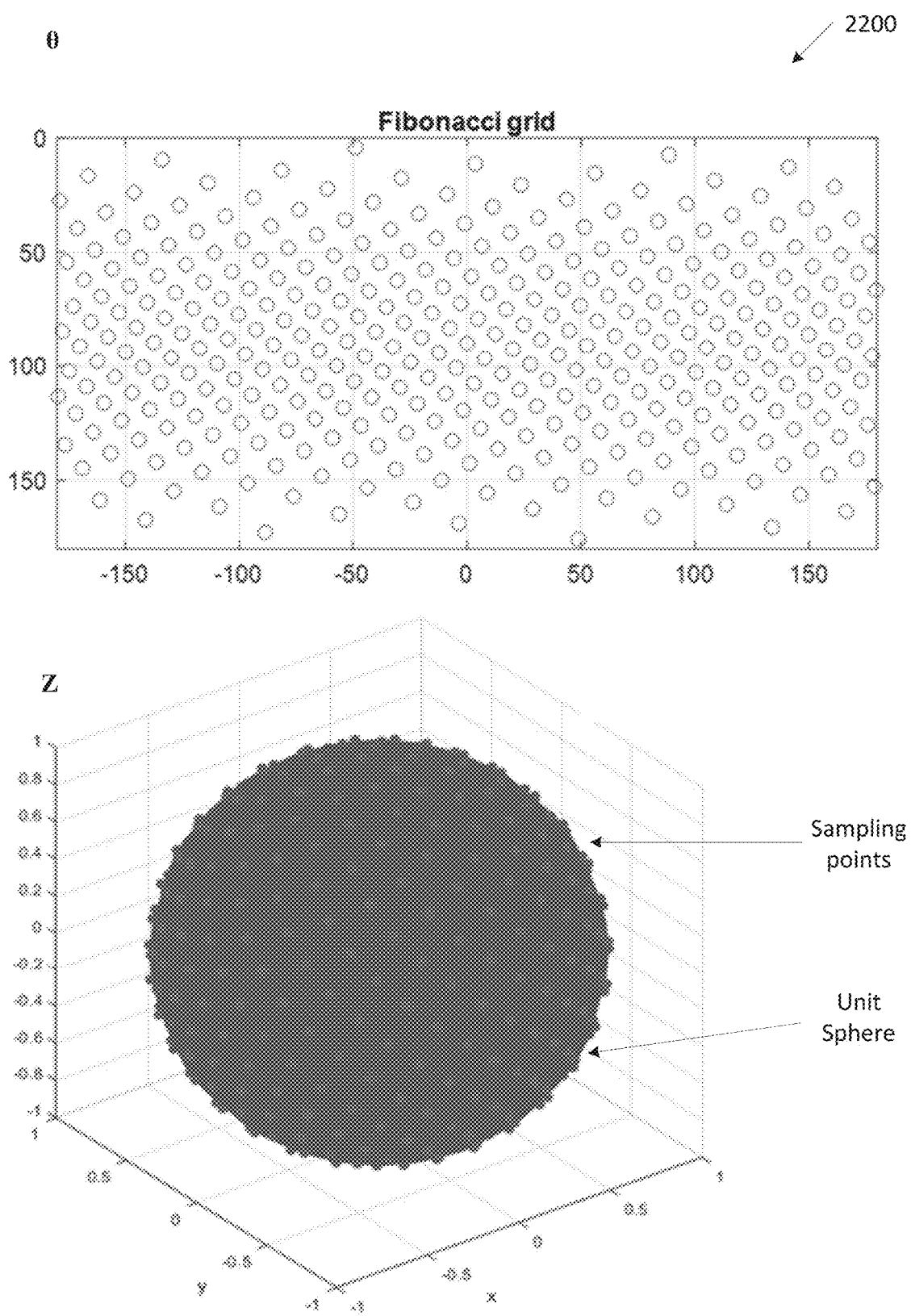
FIG. 22 illustrates an example Fibonacci grid with 363 points on the whole sphere according to embodiments of the present disclosure.

One option of generating the beamforming directions is to make them uniformly distributed on the sphere. There are several different schemes to do this. Each point corresponds to a direction, which is pointing from the origin to the point on the sphere. FIG. 22 is an example of 363 points on the Fibonacci grid.

FIG. 22 illustrates an example Fibonacci grid with 363 points 2200 on the whole sphere according to embodiments of the present disclosure. The embodiment of the Fibonacci grid with 363 points 2200 illustrated in FIG. 22 is for illustration only. FIG. 22 does not limit the scope of this disclosure to any particular implementation.

Smallest number of beams required to cover a target spatial region, such that overlapping of beam patterns at the adjacent beam positions at some gain level (e.g. 3 dB below the max gain) is guaranteed.

Stopping condition supported for the greedy algorithm: codebook size; and target spatial region (defined as azimuth and elevation ranges) is reached. The algorithm is treated as a benchmark algorithm. The strong assumptions required for this algorithm, which states that the beam width is independent of the direction, does not generally hold for antenna arrays.

For the Eigen-based codebook, the candidate codewords are the eigenvectors corresponding to the maximum eigenvalue of $M=e_\theta^c e_\theta^T + e_\varphi^c e_\varphi^T$, sampled over the target spatial coverage region (e.g. whole sphere, semi-sphere). With sufficiently large candidate pool and sufficiently large codebook size, the performance of the Eigen-based codebook approaches that of the upper bound with sum power constraint.

In this codebook design scheme, the beamforming weights can be fixed to 1 (or a constant), only the phase of the eigenvector is used for constructing the codebook.

For the iterative Eigen-based codebook, the candidate codewords are the eigenvectors corresponding to the maximum eigenvalue of $M=e_\theta^c e_\theta^T + e_\varphi^c e_\varphi^T$, sampled over the target spatial coverage region (e.g. whole sphere, semi-sphere). The magnitude of each element of the eigenvectors is restricted to be same. With sufficiently large candidate pool and sufficiently large codebook size, the performance of the iterative Eigen-based codebook approaches that of the upper bound with power constraint per antenna element.

For the DFT codebook, the candidate codeword pool is taken from a DFT matrix. The candidate codewords from the M×N DFT matrix for a K×L antenna array, is given by $$w_{kl} = \frac{1}{\sqrt{M.N}} e^{-j2\pi\left(\frac{nk}{N}+\frac{ml}{M}\right)}$$

where k=0, . . . , K−1, l=0, . . . , L−1, n=0, . . . , N−1 and m=0, . . . , M−1, M and N are equal to $2^b$, where b is the total number of phase shifter bits. The candidate codeword pool size is $2^b$ where b is the number of phase shifter bits.

For the uniform grid codebook, the candidate codeword pool is obtained from uniformly distributed beams on the sphere (see FIG. 22 for illustration of a scheme to generate the candidate set through Fibonacci grid).

For the random phase codebook, the candidate codeword pool is generated with random phases at i-th element ($\varphi_i$), according to $\varphi_i \sim U(0, 2\pi)$, or $(2\pi)/2^b * U\{0, 2^b-1\}$) for b bits phase shifter. Due to the randomness, the codebook generated by this scheme is not unique. Note that this codebook serves as a reference and is not intended as an implementation option.

There is a need to develop a Tx and/or Rx RF beam codebook system in a mmWave wireless communication system. The Tx/Rx RF beam codebook is the set of complex-valued weights that are applied to individual antenna elements on the RF module. The complex-valued weights determine the magnitudes and phases of beamforming matrix applied on the antenna array. In certain design, the magnitude is fixed and only the phase of the beamforming matrix can be changed.

The beam codebook can be applied to both the RF antenna arrays of the base station and the user device, and typically the codebook for the base station and the user device would be different. It may be focusing on the RF beam codebook system design at the user device for the remainder of the disclosure. However, it is understood that the schemes described hereafter can be extended to the RF beam codebook system design at the base station.

The mmWave Tx/Rx RF beam codebook design may be optimized considering the following factors: device design (e.g. material, form factor, antenna module design etc.); users' handling of device (handgrip, orientation, body/object blockage, etc.); and network deployment environment (indoor office, dense urban, urban macro, rural area, etc.).

Figure 23:
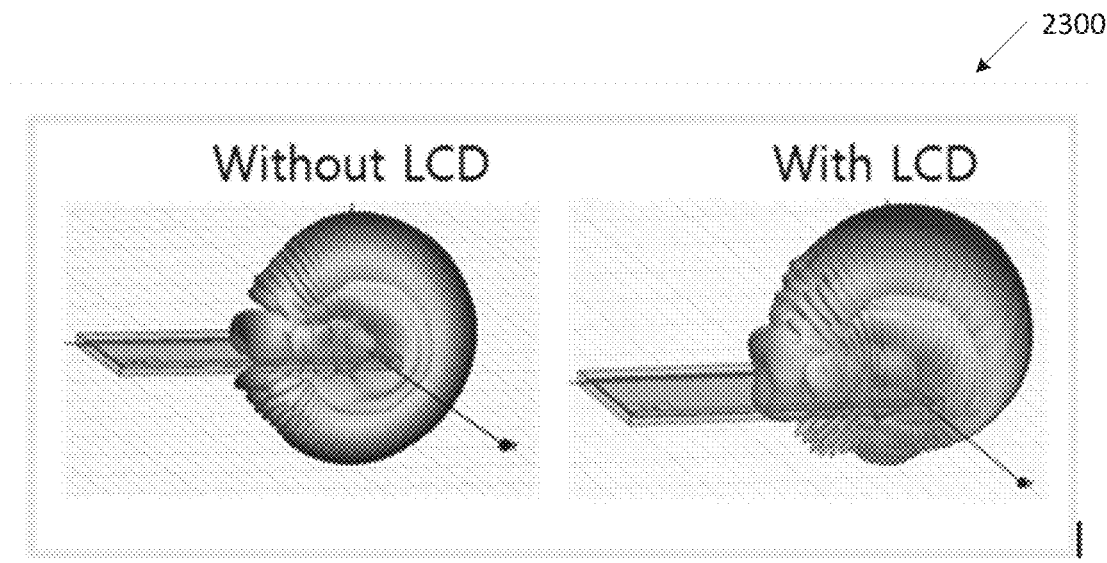
FIG. 23 illustrates an example Impact of LCD to the UE EIRP pattern according to embodiments of the present disclosure.

FIG. 23 illustrates an example impact of LCD 2300 to the UE EIRP pattern according to embodiments of the present disclosure. The embodiment of the impact of LCD 2300 illustrated in FIG. 23 is for illustration only. FIG. 23 does not limit the scope of this disclosure to any particular implementation.

FIG. 23 shows an example of the impact of having a full LCD display covering one side of the UE on the UE's Rx/Tx EIRP pattern. If the UE is equipped with multiple antenna modules, e.g. located at the four corners (or subset) of the rectangular UE, the set of antenna modules that may be turned on to receive or transmit signals can be highly dependent on how the device is being handled by the user. Some examples are illustrated in FIG. 24.

Figure 24:
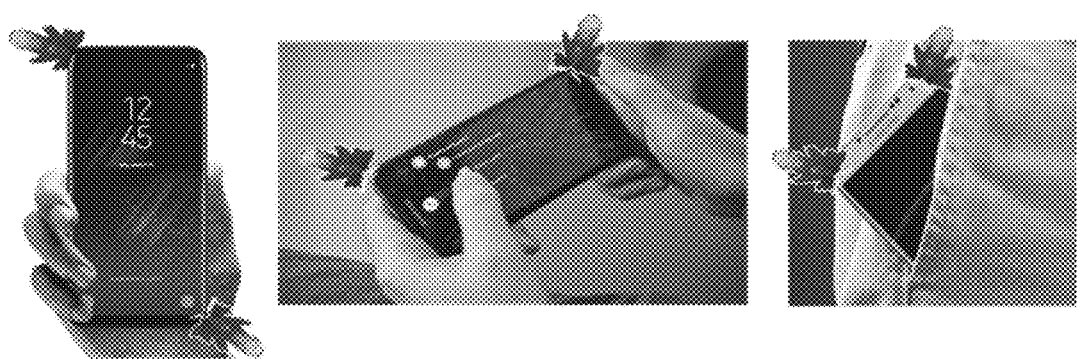
FIG. 24 illustrates an example antenna modules activation based on device handling according to embodiments of the present disclosure.

FIG. 24 illustrates an example antenna modules activation 2400 based on device handling according to embodiments of the present disclosure. The embodiment of the antenna modules activation 2400 illustrated in FIG. 24 is for illustration only. FIG. 24 does not limit the scope of this disclosure to any particular implementation.

There are several ways of designing the Tx/Rx beam codebook. One scheme is a heuristic approach where radio measurement data is collected from real deployment scenarios or from a lab setup that sufficiently mimics the real environment. The measurement data is then post-processed to search for the best Tx/Rx beam codebook according to a predefined objective function, e.g. through gradient descent or machine learning techniques.

The measurement data collection can be manually performed for different environment experienced by the device, such as orientation and movement, or it can be automated with a robot setup. An example of the procedure is described in FIG. 25, where the measurement for various position of the device is assumed performed with a robot setup.

Figure 25:
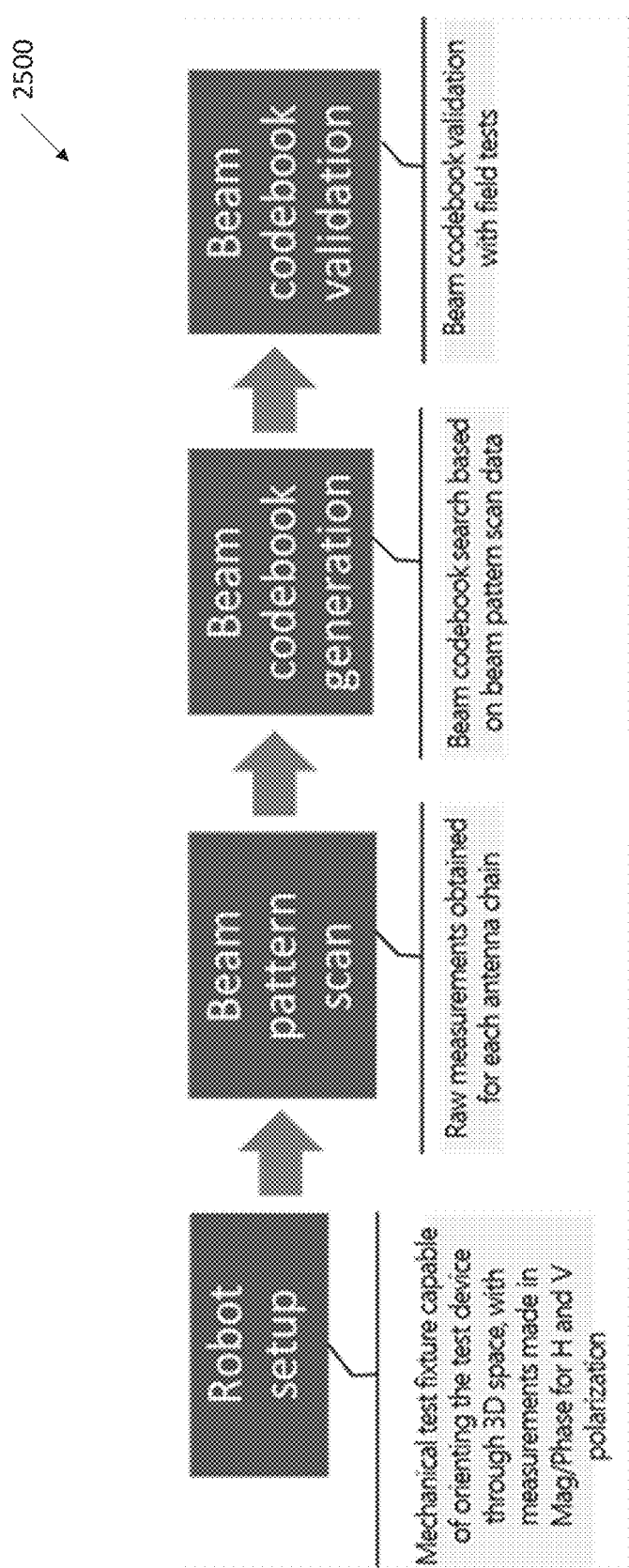
FIG. 25 illustrates an example beam codebook design methodology according to embodiments of the present disclosure.

FIG. 25 illustrates an example beam codebook design methodology 2500 according to embodiments of the present disclosure. The embodiment of the beam codebook design methodology 2500 illustrated in FIG. 25 is for illustration only. FIG. 25 does not limit the scope of this disclosure to any particular implementation.

Referring to FIG. 25, the robot setup is a mechanical test fixture capable of orienting the test device through 3D space, with measurements made in magnitude/phase for H and V polarization. For a given position in the 3D space, raw measurement is obtained for each antenna chain. The measurement is obtained for all the positions that the final beam codebook design may aim to cover. Based on the measurement data collected for all the positions, the beam codebook search based on a predefined performance criterion can be performed. Finally, the beam codebook design can be tested in the field to evaluate the beam codebook's effectiveness.

Another example of beam codebook design methodology is the maximum power exhaustive search beamforming algorithm. The algorithm uses a scheme of spherical sector coverage that takes required spatial sector and antenna beamwidth as input parameters, identifies angular positions of the antenna steering directions to fully cover the given spherical sector and at the same to minimize overlapping between adjacent antenna beams and the number of required antenna positions. After the set of antenna steering directions is identified, the beamforming algorithm iterates over all combinations of transmit and receive antennas steering directions from this set and finds the combination of the transmit and receive antennas positions providing the maximum received power.

Since the optimal Tx/Rx beam codebook highly depends on the scenarios it is designed for, a system that enables the beam codebook to adapt to changing scenario will perform better than just a single one-size-fit-all beam codebook. The present disclosure provides schemes of adapting the beam codebook for the user device over time.

The system includes one or more of the following modules.

In one example, a beam codebook (CB) set is included, comprising multiple beam codebooks, stored in the internal memory of the device. In one example, a module that performs scenario (or context) detection or determination inferred from external inputs, such as the sensors and baseband measurements of the device. A scenario or context can be defined to include one or more of device orientation, user handgrip, body blockage, network deployment scenario, UE speed. Example device orientation includes portrait orientation and landscape orientation. The baseband measurements can be based on signals transmitted by the base station, including SS block, CSI-RS, Tracking Reference Signal (TRS)

In one example, a module that performs codebook selection based on at least the output from the scenario detection module. The codebook selected for each RF antenna module on the device can be different. The output of the module is the beamforming codebook selected for each RF antenna module. In a special case, a selected codebook is applied to all the RF antenna modules.

Figure 26:
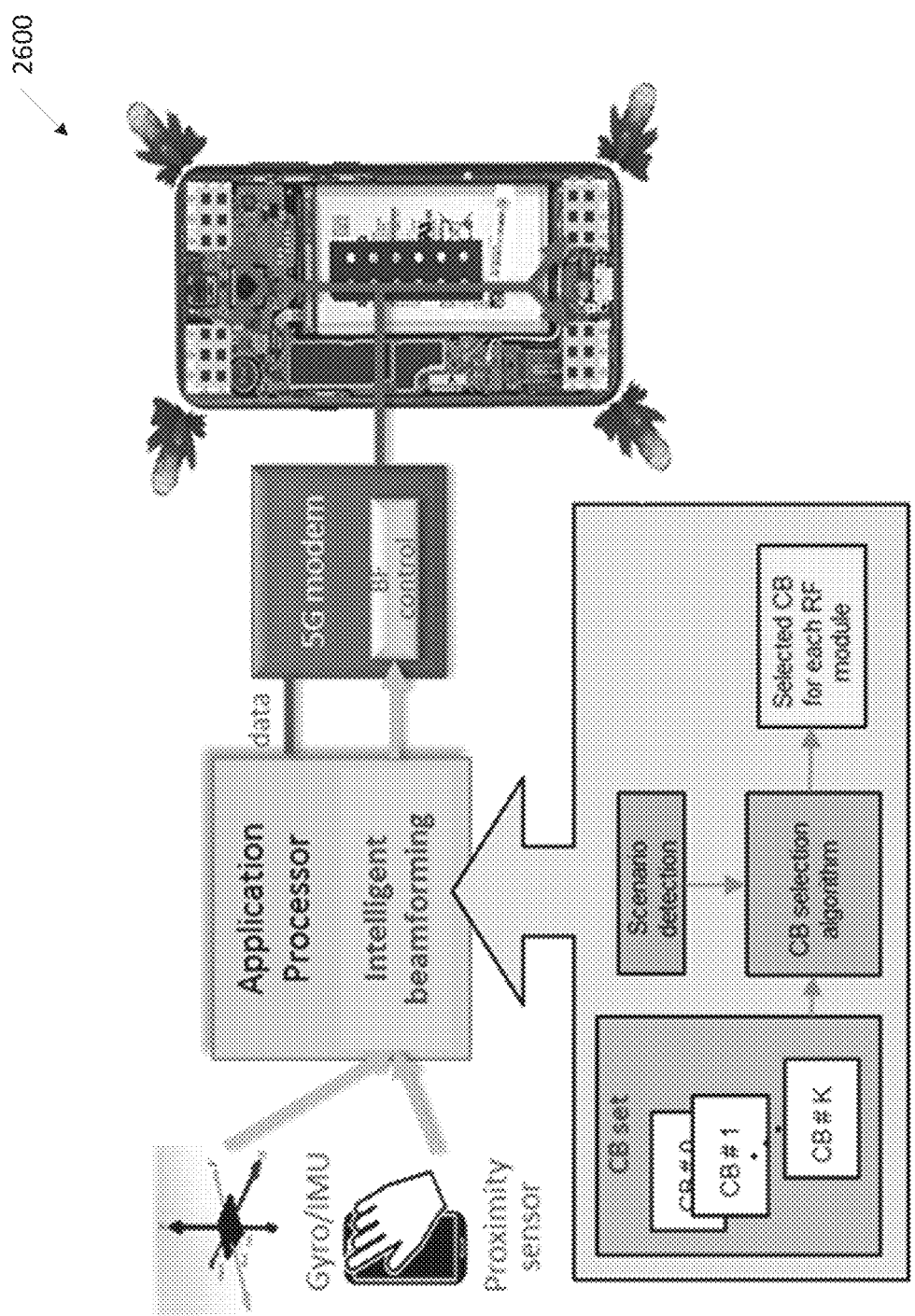
FIG. 26 illustrates an example multi-beam codebook management system according to embodiments of the present disclosure.

FIG. 26 illustrates an example multi-beam codebook management system 2600 according to embodiments of the present disclosure. The embodiment of the multi-beam codebook management system 2600 illustrated in FIG. 26 is for illustration only. FIG. 26 does not limit the scope of this disclosure to any particular implementation.

Figure 27:
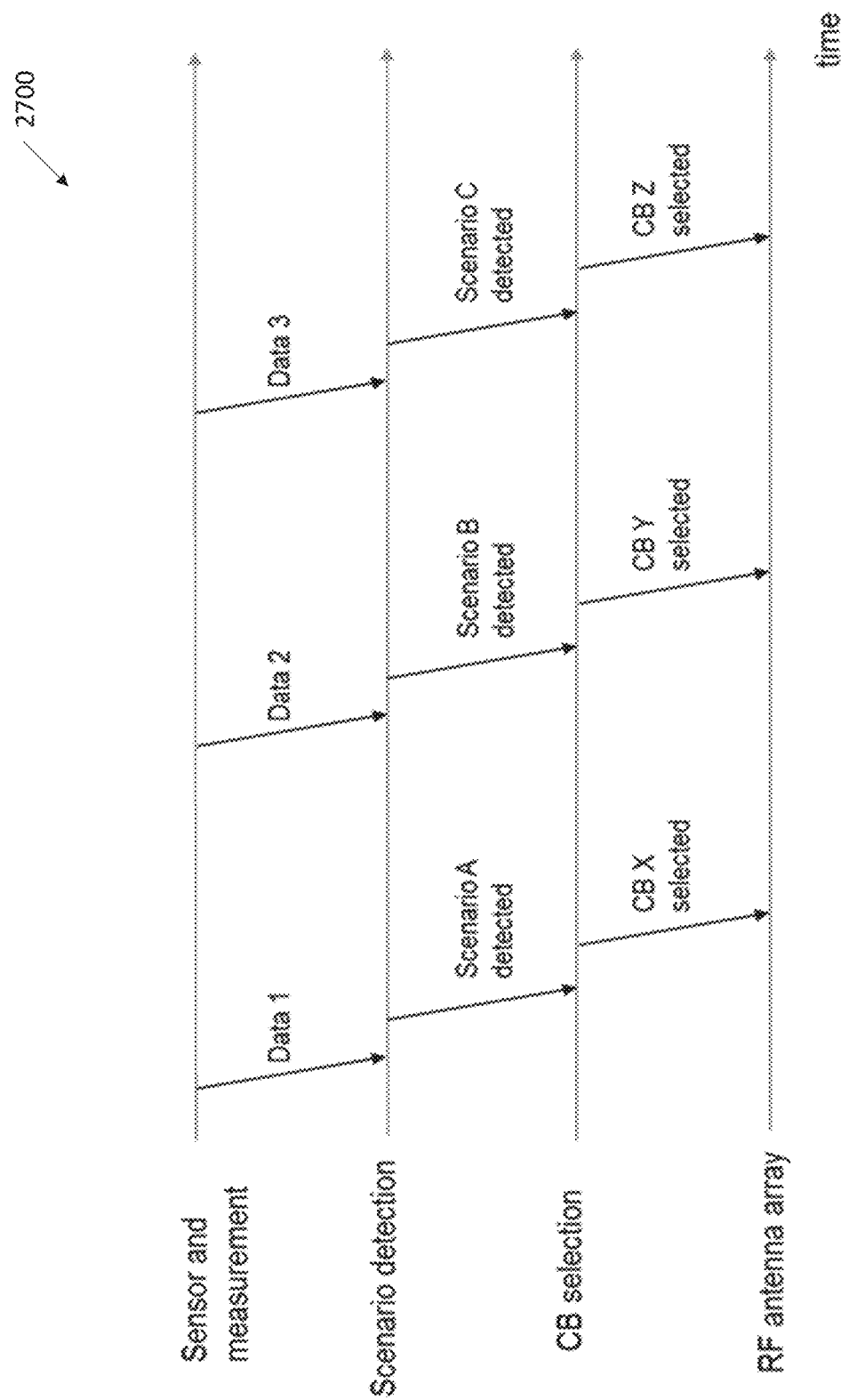
FIG. 27 illustrates an example beam codebook adaptation over time according to embodiments of the present disclosure.

FIG. 27 illustrates an example beam codebook adaptation 2700 over time according to embodiments of the present disclosure. The embodiment of the beam codebook adaptation 2700 illustrated in FIG. 27 is for illustration only. FIG. 27 does not limit the scope of this disclosure to any particular implementation.

The multi-beam codebook system is illustrated in FIG. 26. An example of beam codebook adaptation over time is illustrated in FIG. 27.

In one embodiment, if the UE beam codebook selection function is determined to not able to meet a requirement such as a performance requirement (e.g. RSRP, SINR or the like), the UE can trigger an alternative connectivity technology such as 2G, 3G, 4G, or Wi-Fi radio technologies. This provides a fall back connectivity for the UE. Other scheme to trigger the fall back connectivity is also possible, such as the scenario detection function determines that the scenario detected requires the fall back connectivity.

In one embodiment, an improved beam codebook can be learned based on real-life user data via an on-line beam codebook learning framework. UE measurement data or UE beam data analytics can be collected (in the background) from active user devices and uploaded (e.g. via tunneling) to a cloud control center or a UE beam codebook learning unit, where new improved beam codebook can be learned, redesigned, or fine-tuned. The new UE beam codebook is then pushed back to users' devices for improved beamforming performance.

Figure 28:
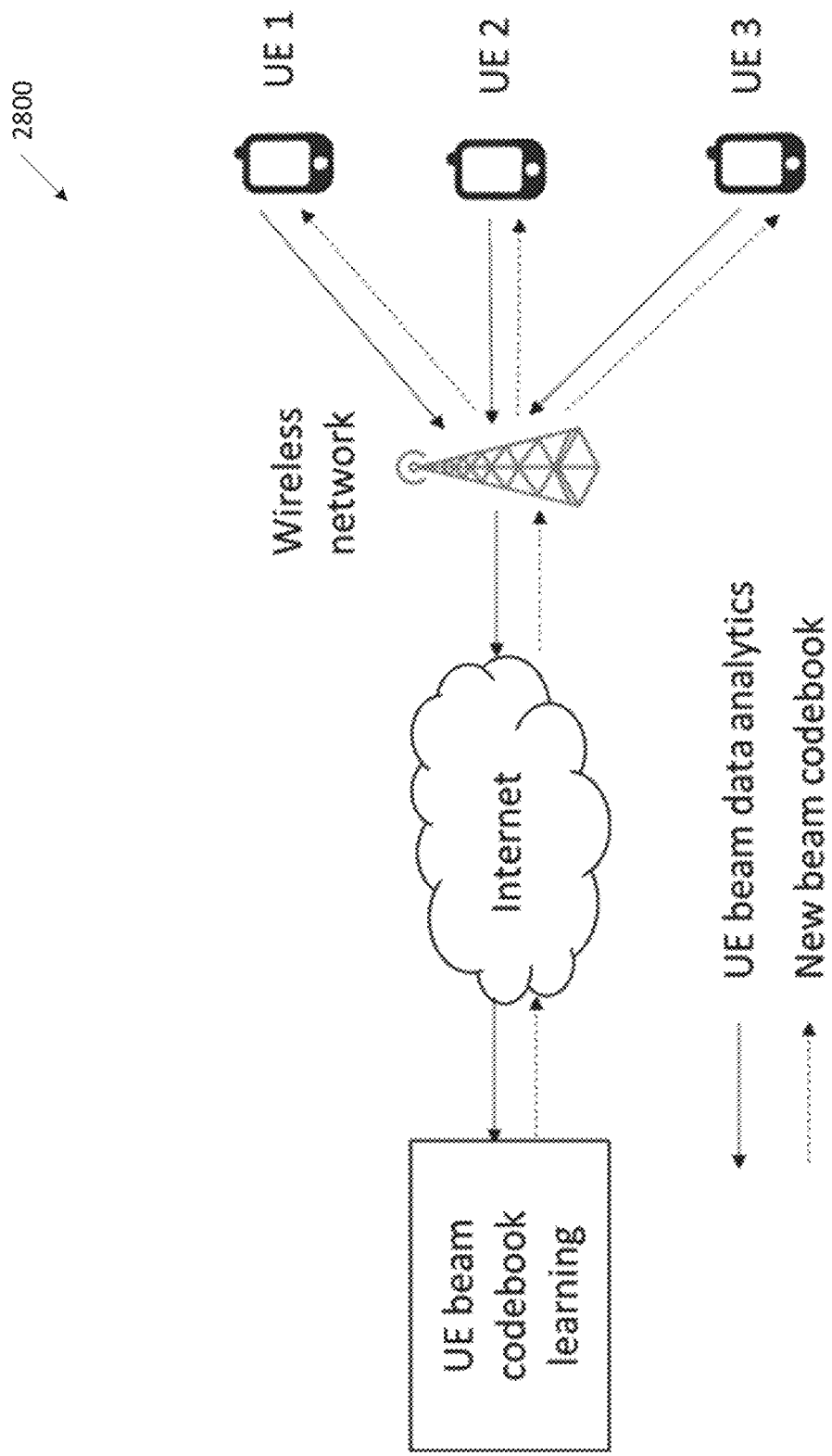
FIG. 28 illustrates an example UE beam codebook learning based on data analytics according to embodiments of the present disclosure.

FIG. 28 illustrates an example UE beam codebook learning 2800 based on data analytics according to embodiments of the present disclosure. The embodiment of the UE beam codebook learning 2800 illustrated in FIG. 28 is for illustration only. FIG. 28 does not limit the scope of this disclosure to any particular implementation.

This framework is illustrated in FIG. 28. The UE beam learning unit can also be located at the edge (wireless network base stations). In one option, the raw UE beam data (i.e. beam identity that is selected at a given time) are sent to the UE beam codebook learning unit for further processing. In another option, the UE beam data are first processed on the terminals to extract certain features or statistics, which are then sent, typically with significantly less amount of data size than the raw data size, to the UE beam codebook learning unit for further processing.

An example of the processed data at terminal is the statistics of UE beam usage rate, i.e. the percentage of time a UE beam is utilized for wireless connection. The UE beams can be indexed to indicate identity of the beam. In one example, the UE beam indexing is performed over all beams of the UE. In another example, the UE beam indexing is perform per antenna module, in which case the antenna module index may be needed to uniquely identify the beam. The beam identity and the corresponding beam usage rate can be sent to the UE beam codebook learning unit. Other examples are the beam searching latency and the rate of occurrence of beam misalignment event. One or more of these beam data can be collected and sent to the UE beam codebook learning unit.

Figure 29:
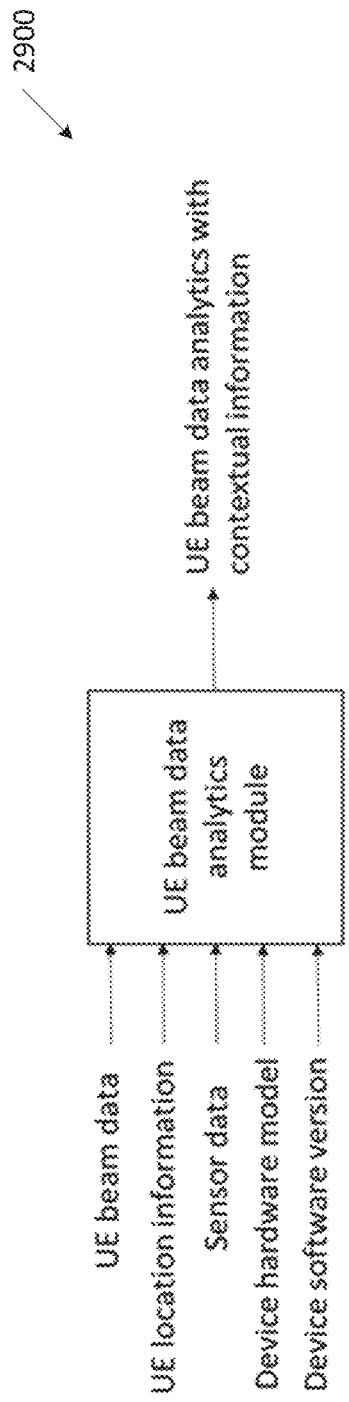
FIG. 29 illustrates an example UE beam data analytics module on terminal according to embodiments of the present disclosure.

FIG. 29 illustrates an example UE beam data analytics module 2900 on terminal according to embodiments of the present disclosure. The embodiment of the UE beam data analytics module 2900 illustrated in FIG. 29 is for illustration only. FIG. 29 does not limit the scope of this disclosure to any particular implementation.

Figure 30:
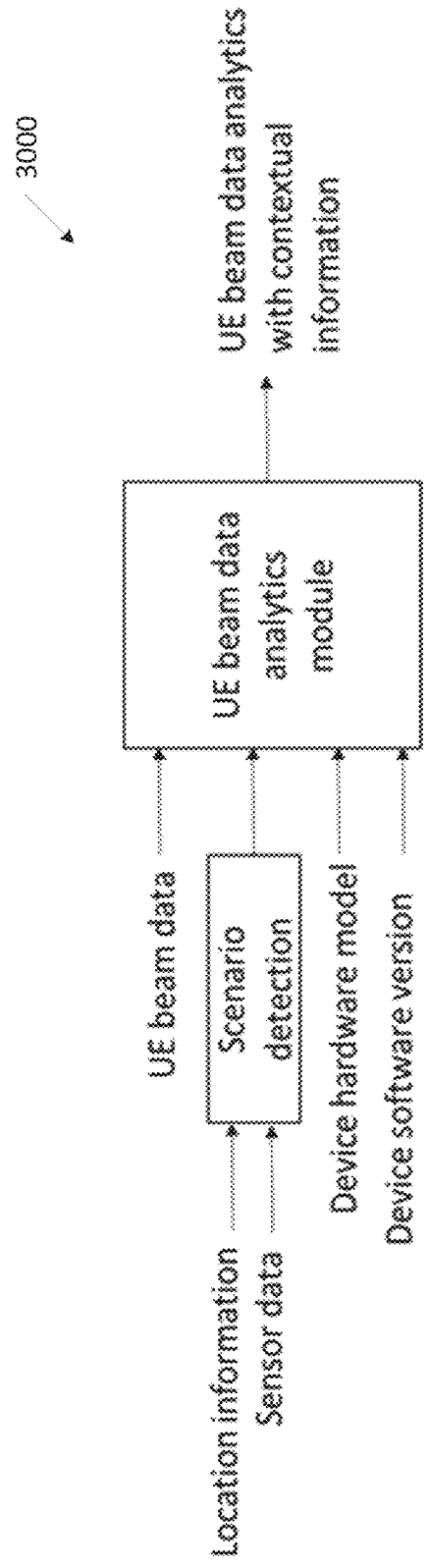
FIG. 30 illustrates another example UE beam data analytics module on terminal according to embodiments of the present disclosure.

FIG. 30 illustrates another example UE beam data analytics module 3000 on terminal according to embodiments of the present disclosure. The embodiment of the UE beam data analytics module 3000 illustrated in FIG. 30 is for illustration only. FIG. 30 does not limit the scope of this disclosure to any particular implementation.

In order to understand the context of the data sent by the UE, additional contextual information can be included. Examples of the contextual information include the UE location information (e.g. obtained from the GPS module), the sensor data on the terminal (e.g. gyroscope, accelerometer, inertial measurement unit (IMU)), the device model and software version.

Some examples of the UE beam data analytics modules are illustrated in FIG. 29 and FIG. 30. In FIG. 30, the scenario detection module can be the same as the scenario detection module in FIG. 26.

Based on the UE data analytics, the UE beam learning unit can either produce a revised beam codebook or a revised set of codebooks for UEs. The codebook(s) can be revised in a dedicated manner for each individual UE. The codebook(s) can also be common (or have strong correlation) for a group of UEs that fit the same contextual profile, e.g. the codebook is common (or have strong correlation) for all UEs of the same hardware model, or the codebook is common (or have strong correlation) for all UEs in the same geographical area.

Upon receiving the revised beam codebook(s) from the UE beam learning unit at the terminal, the UE beam data analytics module can compare the real-life performance of the new beam codebook with that of the original beam codebook. One or more performance metrics can be compared, e.g. the beam usage rate, the beam search latency and the occurrence rate of the beam failure event. If the performance is worse in one or more metrics than the original beam codebook, the module can revert back to the original codebook and provide the new performance information to the UE beam learning unit. This function can also be performed by a different module than the UE beam data analytics module.

Figure 31:
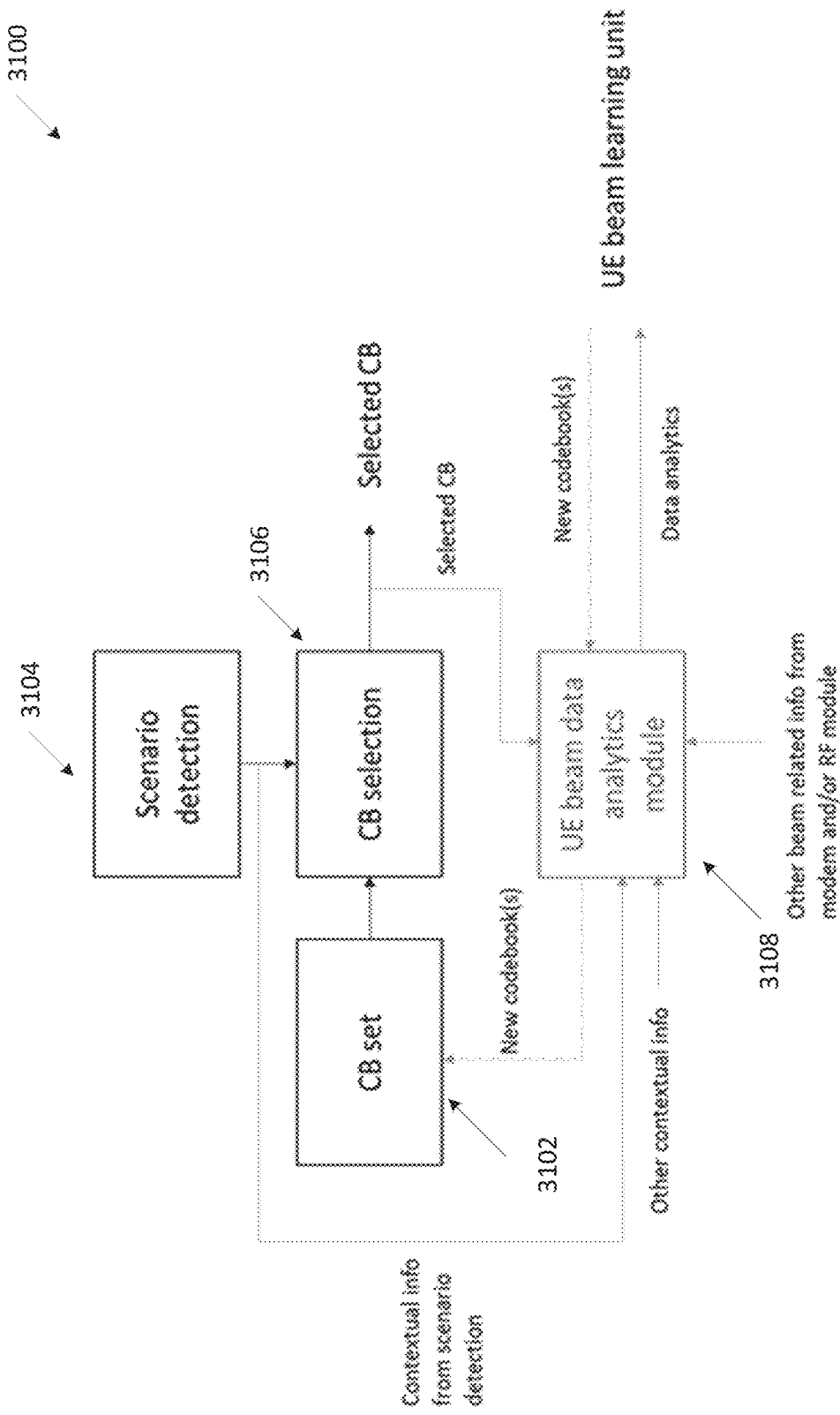
FIG. 31 illustrates an example UE beam data analytics circuit with other beam management blocks on the terminal according to embodiments of the present disclosure.

FIG. 31 illustrates an example UE beam data analytics circuit 3100 with other beam management blocks on the terminal according to embodiments of the present disclosure. The embodiment of the UE beam data analytics module 3100 illustrated in FIG. 31 is for illustration only. FIG. 31 does not limit the scope of this disclosure to any particular implementation.

As illustrated in FIG. 31, the UE beam data analytic circuit 3100 comprises a CB set block 3102, a scenario detection block 3104, a CB selection block 3106, and a UE beam data analytic block 3108. The CB set block 3102 is connected to the CB selection block 3106 and receives new codebook(s) from the UE beam analytic block 3108. The scenario detection block 3104 is connected to the CB selection block 3106. The CB selection block 3106 generates a selected CB that is sent to the UE beam data analytic module 3108. The UE beam data analytic block 3108 receives other contextual information, other beam related information from a modem and/or RF circuit, and new codebook(s). The UE beam data analytic block 3108 generates data analytics to a UE beam learning circuit.

Figure 32:
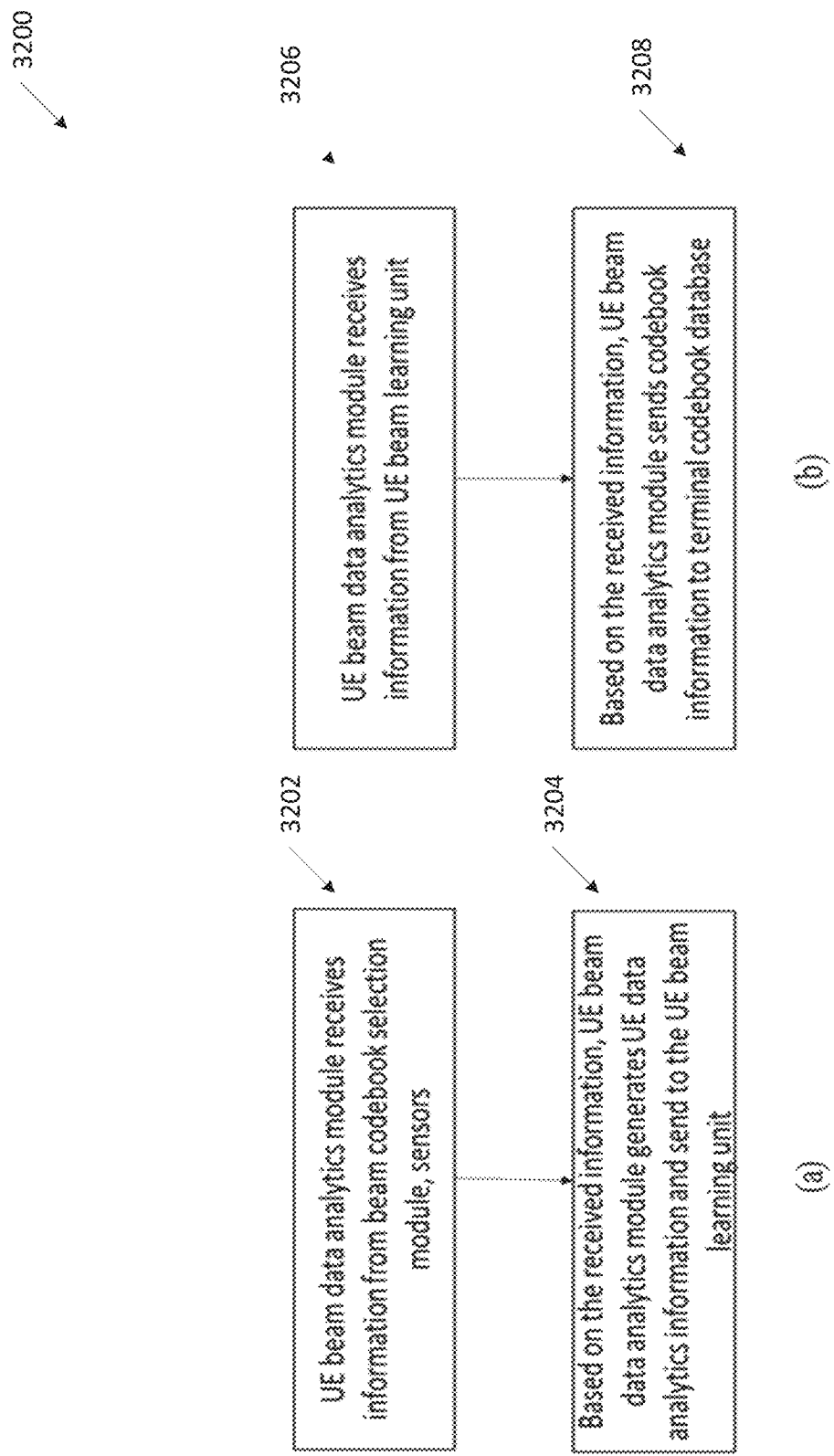
FIG. 32 illustrates an example procedures with UE beam data analytics module according to embodiments of the present disclosure.

FIG. 32 illustrates an example procedure with UE beam data analytics module 3200 according to embodiments of the present disclosure. The embodiment of the procedures with UE beam data analytics module 3200 illustrated in FIG. 32 is for illustration only. FIG. 32 does not limit the scope of this disclosure to any particular implementation.

As illustrated in FIG. 32, in one embodiment, at step 3202, a UE beam data analytic module receives information from beam codebook selection module sensors. At step 3204, based on the received information, the UE beam data analytics module generates UE date analytic information and sends to the UE beam learning units.

As illustrated in FIG. 32, in another embodiment, at step 3206, a UE beam data analytics module receives information from the UE beam learning unit. At step 3208, based on the received information, the UE beam data analytics module sends codebook information to terminal codebook database.

An illustration of the UE beam data analytics module and the other functional blocks for a multi-codebook beam management system is shown in FIG. 31. Example procedures performed by the UE beam data analytics module is given in FIG. 32.

Figure 33:
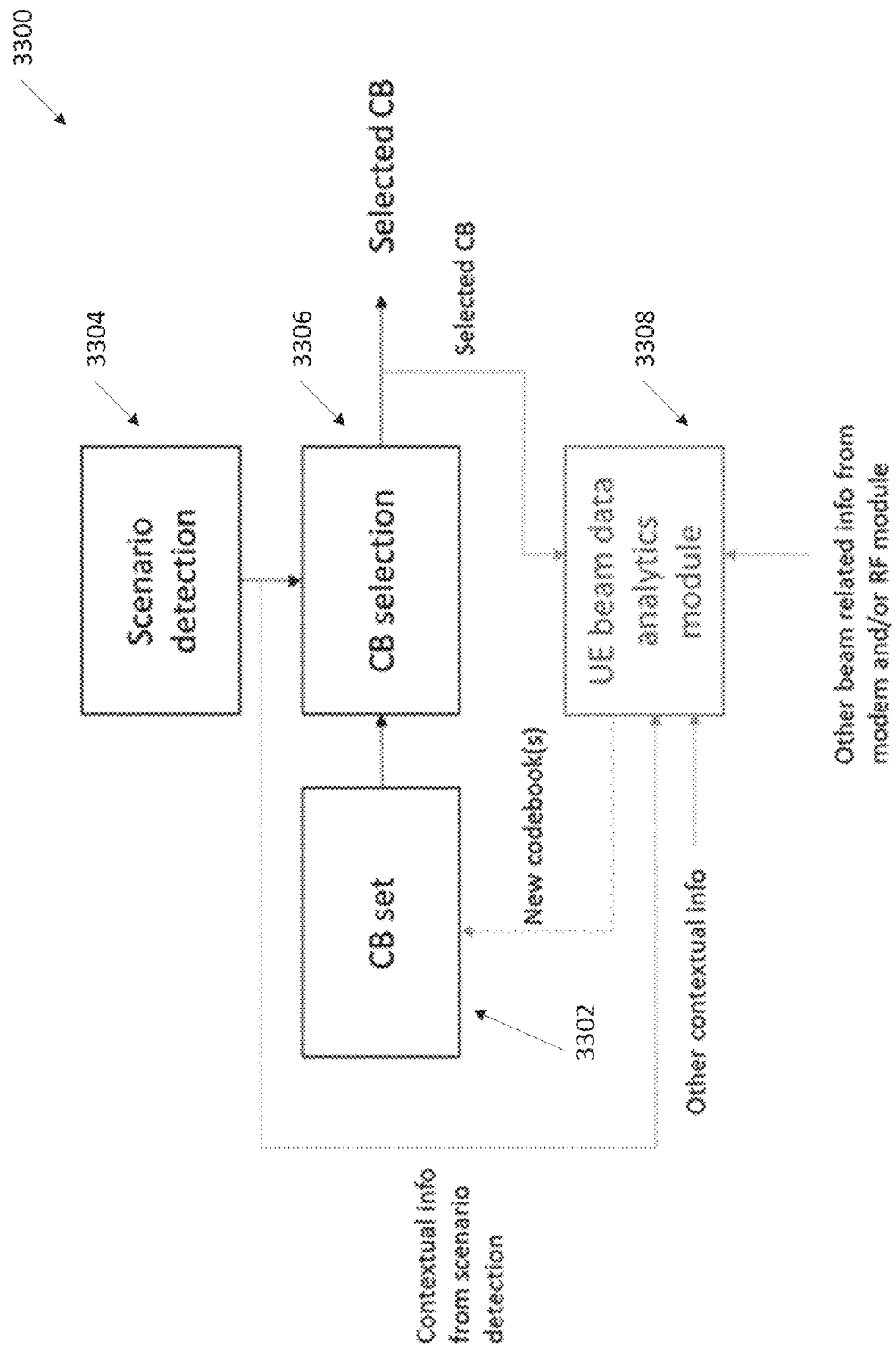
FIG. 33 illustrates an example UE beam data analytics circuit according to embodiments of the present disclosure.

FIG. 33 illustrates an example UE beam data analytics circuit 3300 according to embodiments of the present disclosure. The embodiment of the UE beam data analytics module 3300 illustrated in FIG. 33 is for illustration only. FIG. 33 does not limit the scope of this disclosure to any particular implementation.

As illustrated in FIG. 33, the UE beam data analytic circuit 3300 comprises a CB set block 3302, a scenario detection block 3304, a CB selection block 3306, and a UE beam data analytic block 3308. The CB set block 3302 is connected to the CB selection block 3306 and receives new codebook(s) from the UE beam analytic block 3308. The scenario detection block 3304 is connected to the CB selection block 3306. The CB selection block 3306 generates a selected CB that is sent to the UE beam data analytic module 3308. The UE beam data analytic block 3308 receives other contextual information and other beam related information from a modem and/or an RF circuit.

Figure 34:
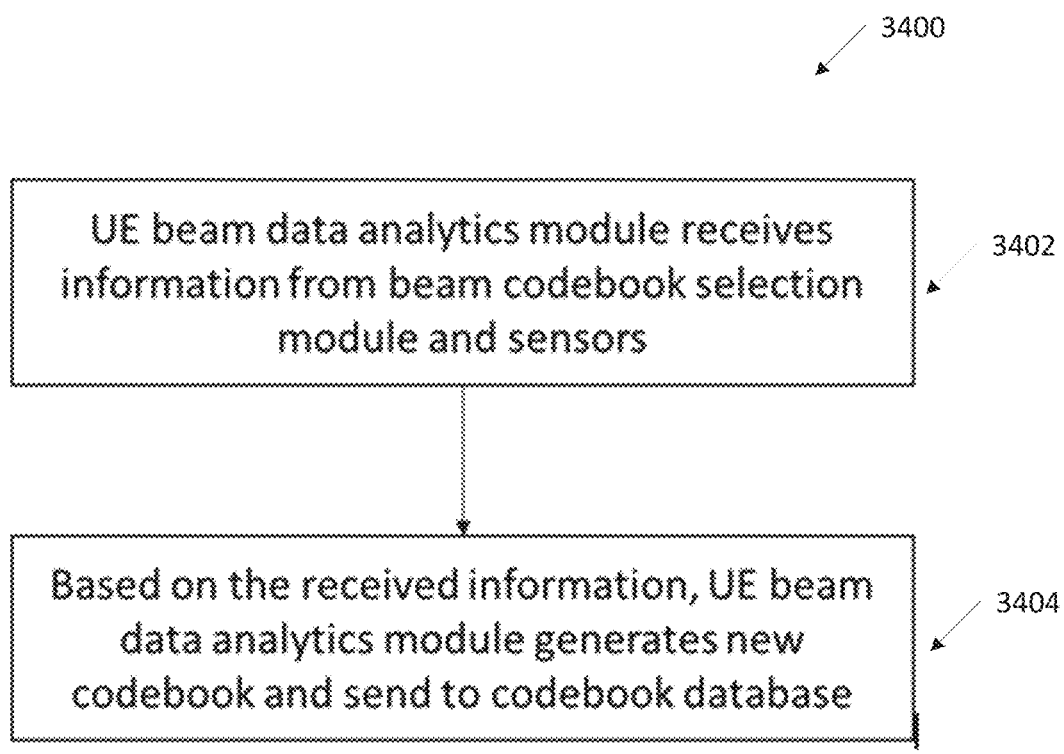
FIG. 34 illustrates a flow chart of a method for UE beam data analytics module according to embodiments of the present disclosure.

FIG. 34 illustrates a flow chart of a method 3400 for UE beam data analytics module according to embodiments of the present disclosure. The embodiment of the method 3400 illustrated in FIG. 34 is for illustration only. FIG. 34 does not limit the scope of this disclosure to any particular implementation.

In another embodiment, the beam learning unit is also located in the UE beam data analytics module on the terminal. An illustration is given in FIG. 33. The aspects mentioned for the previous embodiment is also applicable in this case, except that the new codebook is generated within UE beam data analytics module as well. An example procedure is given in FIG. 34.

To enable user choice of beam learning and update, the option of user consent can be provided on a user interface of the mobile terminal. The option of user consent can be provided in the "connection" setting on the terminal, for "5G mmWave beam learning and update." Other locations are not precluded. If the "5G mmWave beam learning and update" option is turned on, the user's beam data analytics are collected and the beam codebook update is performed, else the user's beam data analytics are not collected and the beam codebook update is not performed.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
   antennas; and
   a processor operably connected to the antennas, the processor configured to:
   identify E-field data of each of the antennas of the UE to be used for transmitting and receiving data;
   generate, based on the E-field data, a set of codewords including a first and second upper bounds, the set of codewords corresponding to candidate beams of each of the antennas;
   select at least one codeword from the set of codewords based on a performance criteria;
   configure a codebook to be used for each of the antennas by adding the at least one codeword into the codebook;

determine whether the codebook including the at least one codeword satisfies a condition to stop adding another codeword to the codebook; and apply the configured codebook for use in transmitting or receiving the data at each of the antennas based on whether the condition is satisfied.

2. The UE of claim 1, wherein the first and second upper bounds are determined by a sum power constraint of an antenna array and a per-element power constraint of each of the antennas, respectively.

3. The UE of claim 1, wherein the set of codewords comprises at least one of a discrete Fourier transform (DFT) codebook, an iterative eigenvector based codebook, an eigenvector based codebook, or a uniform grid codebook.

4. The UE of claim 1, wherein the performance criteria comprises spherical coverage criteria, including at least one of a mean gain or an x-percentile gain across spatial directions.

5. The UE of claim 1, wherein the processor is further configured to:

execute a greedy algorithm to identify the stopping condition based on at least one of a codebook size or a spherical coverage requirement; and quantize the configured codebook based on a constraint of a number of phase shifter bits.

6. The UE of claim 1, wherein the processor is configured to:

receive information comprising at least one of UE beam data, UE location information, sensor data, a device hardware model of the UE, or a device software model of the UE; and generate UE beam data analytics information based on the information.

7. The UE of claim 6, wherein the processor is configured to generate, based on the UE beam data analytics information, a set of beam codebooks comprising at least one of a new beam codebook or an updated codebook, and wherein the set of beam codebooks is used at least one of in a dedicated manner for each UE or in a common manner for a group of UEs based on at least one of a hardware model of the group of UEs or geographical information of the group of UEs.

8. A method of a user equipment (UE) in a wireless communication system, the method comprising:

identifying E-field data of each antenna of the UE to be used for transmitting and receiving data;

generating, based on the E-field data, a set of codewords including a first and second upper bounds, the set of codewords corresponding to candidate beams of each antenna;

selecting at least one codeword from the set of codewords based on a performance criteria;

configuring a codebook to be used for each antenna by adding the at least one codeword into the codebook;

determining whether the codebook including the at least one codeword satisfies a condition to stop adding another codeword to the codebook; and applying the configured codebook for use in transmitting or receiving the data at each antenna based on whether the condition is satisfied.

9. The method of claim 8, wherein the first and second upper bounds are determined by a sum power constraint of an antenna array and a per-element power constraint of each antenna, respectively.

10. The method of claim 8, wherein the set of codewords comprises at least one of a discrete Fourier transform (DFT) codebook, an iterative eigenvector based codebook, an eigenvector based codebook, or a uniform grid codebook.

11. The method of claim 8, wherein the performance criteria comprises spherical coverage criteria, including at least one of a mean gain or an x-percentile gain across spatial directions.

12. The method of claim 8, further comprising:

executing a greedy algorithm to identify the stopping condition based on at least one of a codebook size or a spherical coverage requirement; and quantizing the configured codebook based on a constraint of a number of phase shifter bits.

13. The method of claim 8, further comprising:

receiving information comprising at least one of UE beam data, UE location information, sensor data, a device hardware model of the UE, or a device software model of the UE; and generating UE beam data analytics information based on the information.

14. The method of claim 13, further comprising generating, based on the UE beam data analytics information, a set of beam codebooks comprising at least one of a new beam codebook or an updated codebook, and wherein the set of beam codebooks is used at least one of in a dedicated manner for each UE or in a common manner for a group of UEs based on at least one of a hardware model of the group of UEs or geographical information of the group of UEs.

15. A non-transitory computer readable medium comprising instructions, that when executed by at least one processor of a user equipment (UE), cause the UE to:

identify E-field data of each antenna of the UE to be used for transmitting and receiving data;

generate, based on the E-field data, a set of codewords including a first and second upper bounds, the set of codewords corresponding to candidate beams of each antenna;

select at least one codeword from the set of codewords based on a performance criteria;

configure a codebook to be used for each antenna by adding the at least one codeword into the codebook;

determine whether the codebook including the at least one codeword satisfies a condition to stop adding another codeword to the codebook; and apply the configured codebook for use in transmitting or receiving the data at each antenna based on whether the condition is satisfied.

16. The non-transitory computer readable medium of claim 15, wherein the first and second upper bounds are determined by a sum power constraint of an antenna array and a per-element power constraint of each antenna, respectively.

17. The non-transitory computer readable medium of claim 15, wherein the set of codewords comprises at least one of a discrete Fourier transform (DFT) codebook, an iterative eigenvector based codebook, an eigenvector based codebook, or a uniform grid codebook.

18. The non-transitory computer readable medium of claim 15, wherein the performance criteria comprises spherical coverage criteria, including at least one of a mean gain or an x-percentile gain across spatial directions.

19. The non-transitory computer readable medium of claim 15, further comprising instructions, that when executed by the at least one processor, cause the UE to:

execute a greedy algorithm to identify the stopping condition based on at least one of a codebook size or a spherical coverage requirement; and quantize the configured codebook based on a constraint of a number of phase shifter bits.

20. The non-transitory computer readable medium of claim 15, further comprising instructions, that when executed by the at least one processor, cause the UE to:
receive information comprising at least one of UE beam data, UE location information, sensor data, a device hardware model of the UE, or a device software model of the UE;
generate UE beam data analytics information based on the information; and
generate, based on the UE beam data analytics information, a set of beam codebooks comprising at least one of a new beam codebook or an updated codebook, wherein the set of beam codebooks is used at least one of in a dedicated manner for each UE or in a common manner for a group of UEs based on at least one of a hardware model of the group of UEs or geographical information of the group of UEs.

* * * * *